United States Patent [19]

Hirota et al.

[11] 4,388,883
[45] Jun. 21, 1983

[54] STITCH PATTERN SEWING MACHINE

[75] Inventors: Kunio Hirota; Masao Shimomura, both of Nagoya, Japan

[73] Assignee: Brother Kogyo Kabushiki Kaisha, Nagoya, Japan

[21] Appl. No.: 237,423

[22] Filed: Feb. 24, 1981

[30] Foreign Application Priority Data

Mar. 5, 1980 [JP] Japan .................................. 55-28394
Mar. 19, 1980 [JP] Japan .................................. 55-37270

[51] Int. Cl.³ ............................................ D05B 21/00
[52] U.S. Cl. ................................................ 112/121.12
[58] Field of Search .......... 112/121.12, 158 E, 121.11, 112/102, 103

[56] References Cited

U.S. PATENT DOCUMENTS 4,135,459 1/1979 Manabe et al. ................. 112/121.12
4,222,339 9/1980 Iwako ............................. 112/158 E
4,309,950 1/1982 Franklin ............................. 112/103
4,326,473 4/1982 Kigawa ............................. 112/158 E Primary Examiner—Peter P. Nerbun
Attorney, Agent, or Firm—Browdy and Neimark

[57] ABSTRACT

An automatic embroidery or stitch pattern sewing machine provided with a memory for storing plural blocks of cell pattern information respectively including zone data related to figure and location of a triangular or quadrangular zone on which a cell stitch pattern is to be formed, and a manual input device for setting up desired number of stitches to be formed in the zone. Based on the position data stored in the memory and the stitch number data set by the manual input device, a microprocessor connected thereto calculates the position data of the actual stitch forming positions; and a drive mechanism relatively moves the needle and the workpiece according to the position data calculated. Many cell stitch patterns thus formed on the workpiece turns out to be a desired unit stitch pattern such as a letter, symbol and other patterns.

8 Claims, 53 Drawing Figures

FIG. 4

| ADDRESS | MEMORY CONTENTS | |
|---|---|---|
| 0000 〜 1FFF | MEMORY AREA FOR CONTROL PROGRAM | 66a |
| 2000 〜 7FFF | MEMORY AREA FOR VARIOUS PATTERN DATA (DATA BANK) | 66b } 66 |
| 8000 〜 9FFF | WORKING REGISTER AREA FOR VARIOUS CONTROL AND ARITHMETIC OPERATIONS | 65 |
| C000 | PIT | 67 |
| D000 | TC1,TC2 \| CONTROL SIGNAL FOR PULSE MOTOR <br> VARIOUS CONTROL SIGNALS | |
| E000 | KEY INPUT CODE <br> KEYBOARD CONTROL SIGNAL | 68 |
| F000 | DISPLAY CODE SIGNAL <br> VARIOUS DISPLAY CONTROL SIGNAL | |
| FFFF | | |

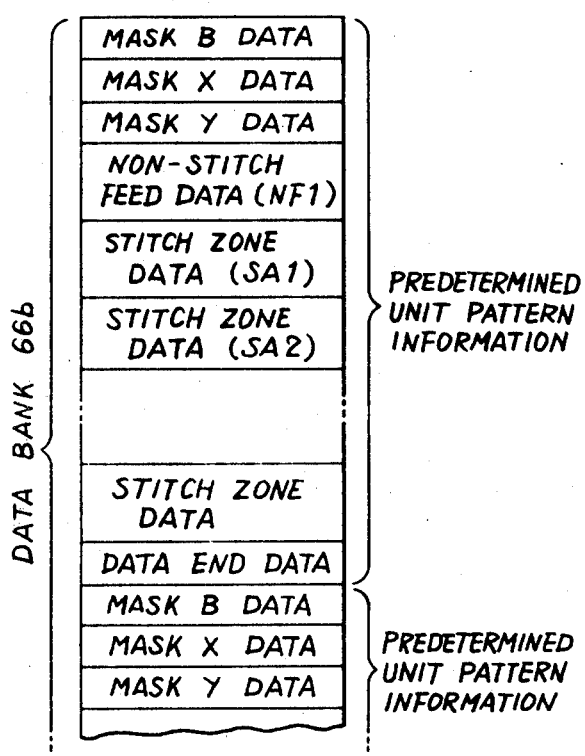

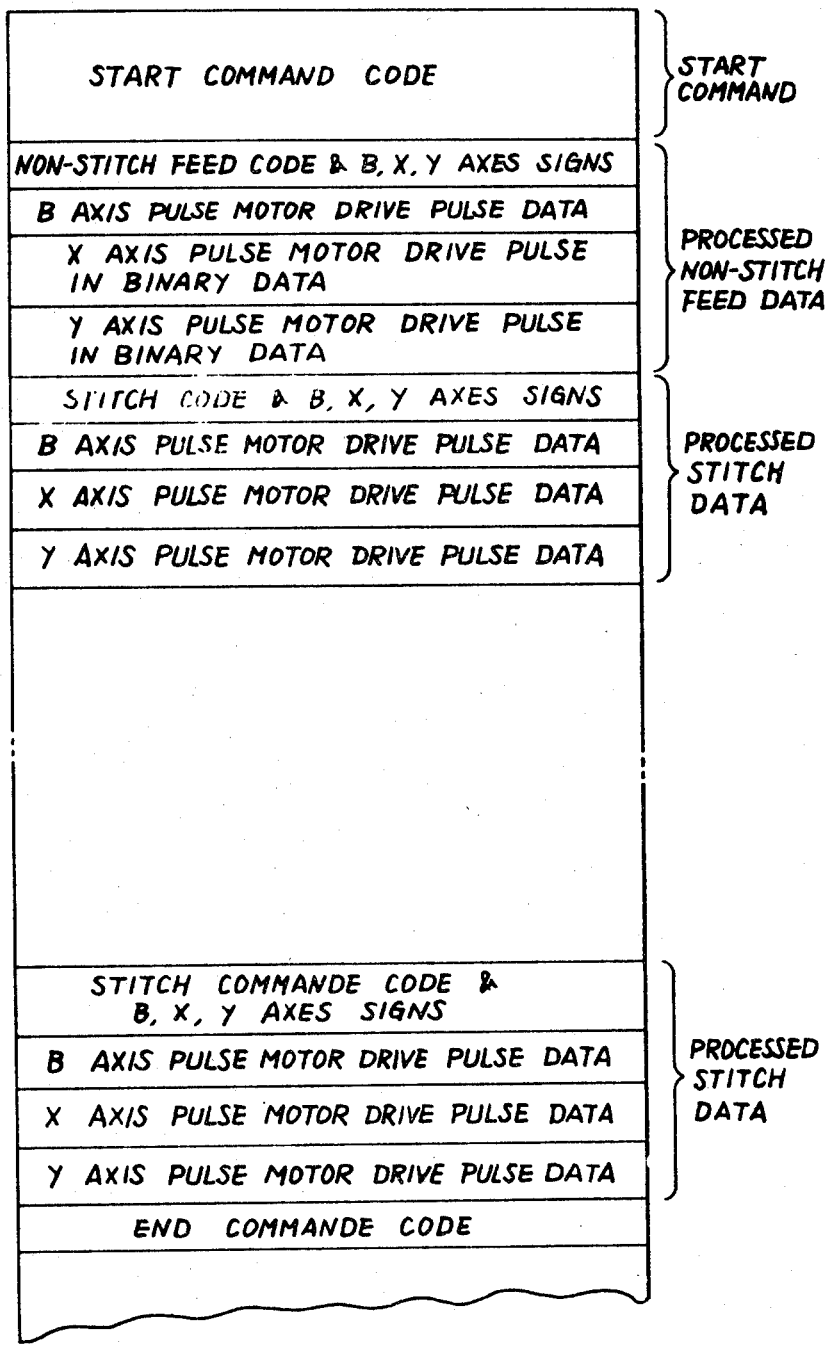

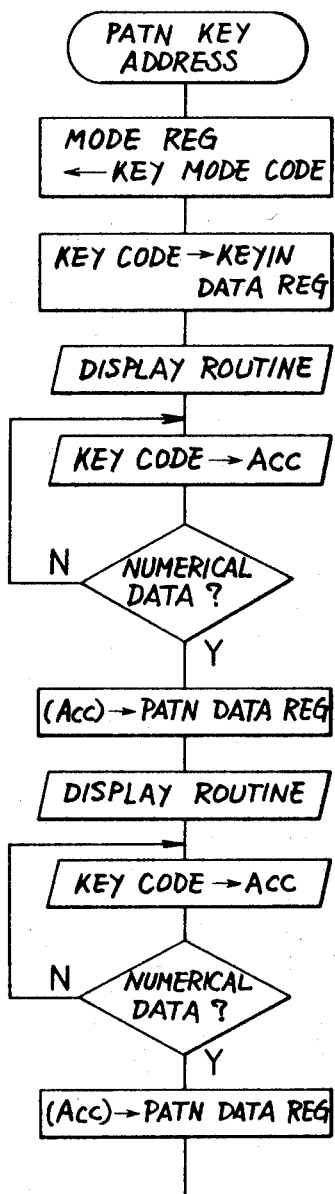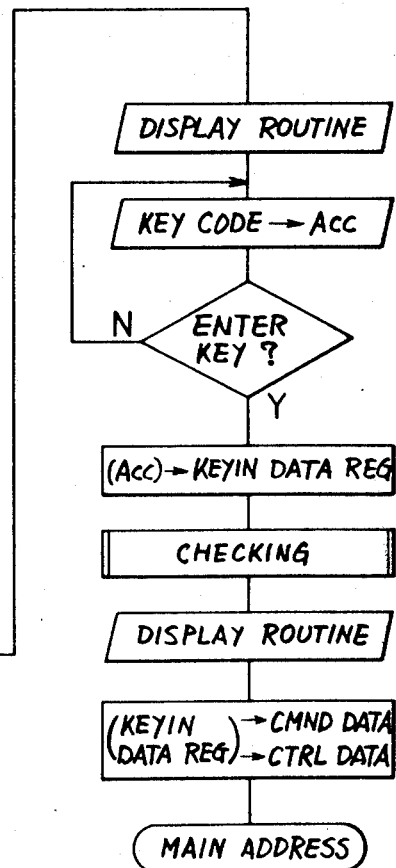
FIG. 30

FIG. 38
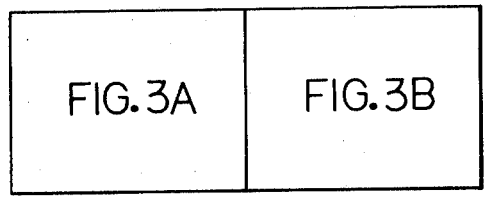
FIG. 40
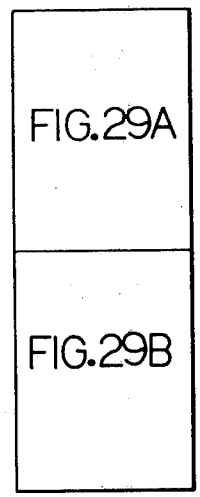
FIG. 39
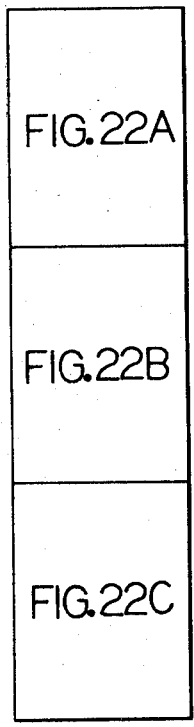
FIG. 41
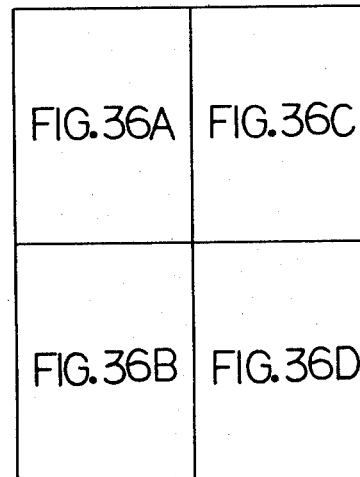
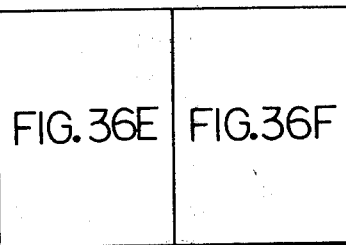
FIG. 42
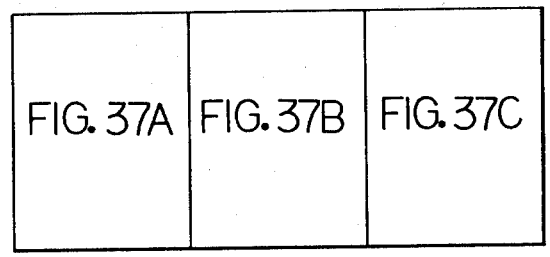

STITCH PATTERN SEWING MACHINE

BACKGROUND OF THE INVENTION

This invention relates to a sewing machine wherein a needle and a workpiece are relatively moved to each other based on pattern data stored in advance in memory means for automatically forming a stitch pattern on the workpiece with a plurality of stitches formed by means of vertical movement of the needle.

In conventional automatic sewing machines of this type each position data of many stitches corresponding to desired pattern is consecutively stored as pattern data in memory means such as paper tapes, magnetic tapes, semiconductor memory means, etc., and the needle and the workpiece are relatively moved to each other based on the stored pattern data, while the needle is vertically reciprocated, to form a stitch pattern on the workpiece with many stitches. Therefore, the number of position data stored in the memory means, in the conventional machines, coincides with that of the all of the stitches. This brings about a great demerit, for example, preparing of pattern data even for a simple polygonal pattern requires that all of the pattern data regarding the all stitches are stored. As a result of this, the number of the pattern data to be stored amounts very large so as to occupy a lot of memory capacity in addition to a problematical time-consuming operation of working out the pattern data. Thus prepared pattern data can be used exclusively for a pattern of a predetermined size and shape. Even when forming a similar pattern in the whole configuration, but being dissimilar only in the stitch distance and the number of stitches, this pattern data can not be used at all. Separate pattern data adapted to the stitch distance and number must be prepared.

In the conventionally proposed sewing machines of this type of workholder for holding the workpiece is simply adapted to relatively move to the needle which is designed to move vertically alone. If therefore a stitch pattern requiring many zigzag stitches is formed on a workpiece, the workholder itself must be moved zigzag. For high speed zigzag movement of the workholder in case of rapidly forming zigzag stitches on the workpiece, a particular driving means such as a large capacity pulse motor capable of responding to the high speed is badly needed.

OBJECTS AND SUMMARY OF THE INVENTION

The primary object of this invention is therefore to provide a sewing machine wherein the number of pattern data which should be stored in memory means may be diminished.

Another object of this invention is to provide a sewing machine wherein preparation of pattern data corresponding to desired pattern such as letters, etc., can be easily performed and a partial alteration of the once prepared pattern data can be smoothly performed.

Still another object of this invention is to provide a sewing machine, wherein when an embroidery or stitch pattern consists of zigzag stitches is formed in a rapid speed the workholder and the needle can be relatively moved for forming zigzag stitches on the workpiece by means of driving means, such as pulse motors, which are relatively low in responding capacity and output force.

For the purpose of attaining those objects a sewing machine in accordance with the present invention is provided with memory means for storing cell pattern information including zone data related to figure and location of a zone on which the stitch pattern is to be formed; manual input means for setting up desired number of stitches to be formed in the zone, which manual input means generating stitch number data corresponding to the number of stitches; and control means for calculating position data related to the actual stitch positions according to the zone data and the stitch number data, and for supplying the calculated position data to the drive means in timed relation with the reciprocation of the needle.

The above-mentioned cell stitch pattern is in most cases a part of a unit stitch pattern such as a letter pattern, symbol pattern, etc. In a particular case however, wherein the unit stitch pattern is of extremely simple configuration it may contain only one cell stitch pattern; in this case the sphere in which this unit stitch pattern should be formed is not divided into plural zones. And on the other hand, the unit stitch pattern above-mentioned can be combined in plural into a combination stitch pattern.

In this invention therefore the time required for preparing pattern data is greatly diminished, because bothering of seeking every coordinate data one by one corresponding to all the stitch forming points is relieved. As the number of stitches formed in a zone above-mentioned can be set by the operator at will, in this invention, an alteration operation of the stitch pattern data in a case, for example, wherein a new pattern with the same whole configuration to the once prepared pattern data, being dissimilar only in the number of stitches formed there, can be easily performed.

This sewing machine is preferably provided, for attaining the above-mentioned objects, with a needle capable of endwise reciprocating and laterally jogging, first drive means for controlling the jogging movement of the needle, a workholder for holding a workpiece during sewing operation adapted to be movable in a coordinate plane defined by X and Y axes which are right angled, second drive means for varying the position of the workholder against the needle on the coordinate plane, and semi-conductor memory means for storing first data related to the amount of jogging of the needle and second data related to the position of the workholder. Based on the first and second data from the semi-conductor memory means, the first and second drive means are driven in response to the reciprocating movement of the needle so as to form a stitch pattern of zigzag shape on the workpiece. As can be understood from the above, the movement amount of the workholder is diminished because of the capability of jogging movement of the needle itself. It enables pattern formation in high speed with a pulse motor of low responding capacity and output force, as a drive means for driving the workholder. Another feature of this invention resides in the adoption of the semi-conductor memory means, as the memory means, which enables storing of the first and second data in high density.

Other objects and effects of this invention will be apparent from the study of the description of the embodiments.

BRIEF DESCRIPTION OF THE DRAWING

FIG. 4 is a map indicating addresses of elements or devices incorporated in the electric circuitry;

FIG. 5 is a map indicating contents of a data bank provided in a ROM which is incorporated in the circuitry;

FIGS. 6 through 9 are maps of registers provided in a RAM which is incorporated in the circuitry;

FIG. 30 is a flow chart showing a PATN (pattern) KEY routine of the control program;

FIG. 38 is a view illustrating the manner in which FIGS. 3A and 3B are assembled;

FIG. 39 is a view illustrating the manner in which FIGS. 22A, 22B and 22C are assembled;

FIG. 40 is a view illustrating the manner in which FIGS. 29A and 29B are assembled;

FIG. 41 is a view illustrating the manner in which 36A, 36B, 36C, 36D, 36E and 36F are assembled;

FIG. 42 is a view illustrating the manner in which 37A, 37B and 37C are assembled.

DETAILED DESCRIPTION OF THE PREFERRED EMBODIMENT

A preferred embodiment of the present invention is described in detail with reference to the accompanying drawings FIGS. 1 through 42.

Figure 1:
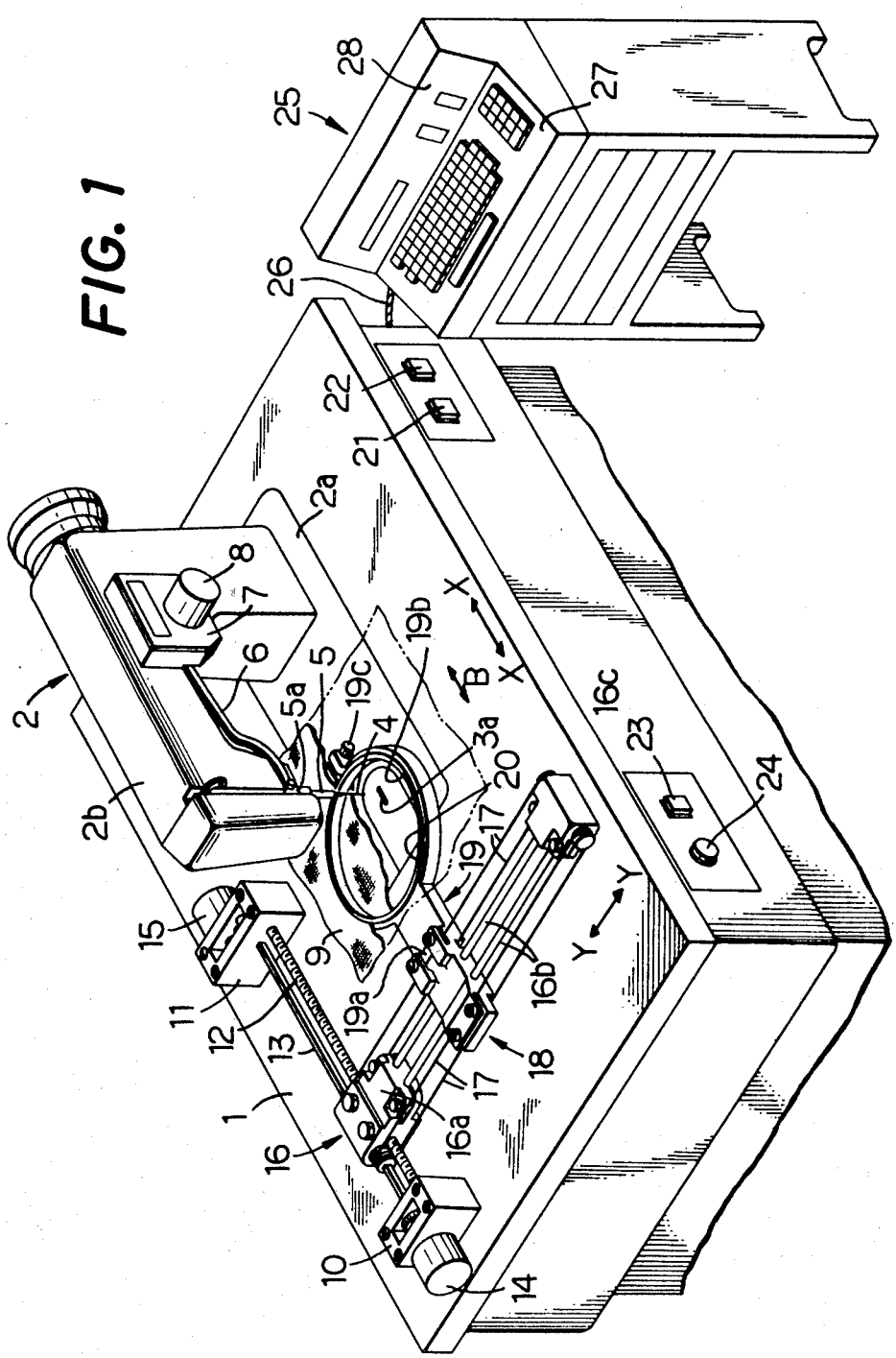
FIG. 1 is a perspective view illustrating an embodiment of an automatic industrial sewing machine in accordance with the present invention.

Referring first to FIG. 1, there is shown an industrial sewing machine, a machine frame 2 of which is mounted on a machine table 1 and consists of a bed 2a and an arm 2b. The bed 2a is equipped thereon with a throat plate 3 which includes a needle aperture 3a in an almost central portion thereof. At a lower end of the arm 2b is provided a needle bar 5 which holds a needle 4 and is connected to an oscillating lever 6 via a needle bar connecting stud 5a while on a front side of the arm 2b are mounted an adjusting mechanism 7 which adjusts an oscillating amount of the oscillating lever 6, and a first pulse motor 8 which is operationally connected to the adjusting mechanism 7 to set the oscillating amount. With this arrangement, the needle 4, in cooperation with a looptaker (not shown) built in the machine frame 2, forms zigzag lock stitches in a longitudinal direction (indicated by arrows B) on a workpiece 9 by means of vertical reciprocation of the needle bar 5 due to a rotary action of an arm shaft (not shown), and an oscillatory action of the oscillating lever 6 (in the direction indicated by the arrows B).

On a rear portion of a top surface of the machine table 1, there are provided a pair of mounting brackets 10 and 11 which are spaced longitudinally at a predetermined distance and fixed to the table 1 with a plurality of screws. A feed screw 12 and a rotation transmitting shaft 13 are rotatably supported at both ends thereof by the mounting brackets 10 and 11 so that they extend therebetween in parallel to the top surface of the machine table 1. The mounting bracket 10 is provided with a second pulse motor 14 which drives the feed screw 12 through a gearing system, and the other bracket 11 with a third pulse motor 15 which drives the rotation transmitting shaft 13.

The feed screw 12 engages a rear support portion 16a of a movable unit 16 which provides an X-axis motion to enable the latter to move in an axial direction of the screw 12, and the movable unit 16 includes guide tubes 16b which extend in a direction normal to the rotation axes of the feed screw 12 and rotation transmitting shaft 13, and a front support portion 16c. The guide tubes 16b on the movable unit 16 support another movable unit 18 which provides a Y-axis motion to enable the same to slidably move in an axial direction of the tubes, the movable unit 18 being fixed to a pair of connecting wires 17 which are connected to the rotation transmitting shaft 13. An embroidery frame 19 made of polyacetal or other synthetic resin materials, comprises a mounting portion 19a at which the frame 19 is fixed to the movable unit 18, an annular workholding portion 19b which is disconnected at a part of its circumference to provide a radial opening, a tightening screw 19c, and an inner embroidery frame 20 which is fitted in the workholding portion 19b and cooperates with the same to hold the workpiece 9. Accordingly, the embroidery frame 19 may be moved in the longitudinal direction (along the X-axis indicated by arrows X) by a rotary action of the second pulse motor 14 through the feed screw 12, X-axis motion 16, etc., and in the cross direction perpendicular to the X-axis direction (along the Y-axis indicated by arrows Y) by a rotary action of the third pulse motor 15 through the rotation transmitting shaft 13, connection wires 17, movably unit 18, etc.

On a front side of the machine table 1, there are provided a power-on switch 21, a power-off switch 22, embroidering start switch 23 and an emergency stop switch 24. At a location near the machine table 1, is installed a control device 25 which is connected to a cable 26 through which signals to drive a main drive motor 74a (FIG. 3) for driving the arm shaft (not shown) in the machine body 2, and the first, second and third pulse motors 8, 14 and 15 are transferred from the control device 25. The control device 25 has a programming keyboard 27 used to enter data necessary to form an intended embroidery or stitch pattern on the workpiece 9, and a display panel 28 which indicates data obtained as a result of programming operations through the keyboard 27.

Figure 2:
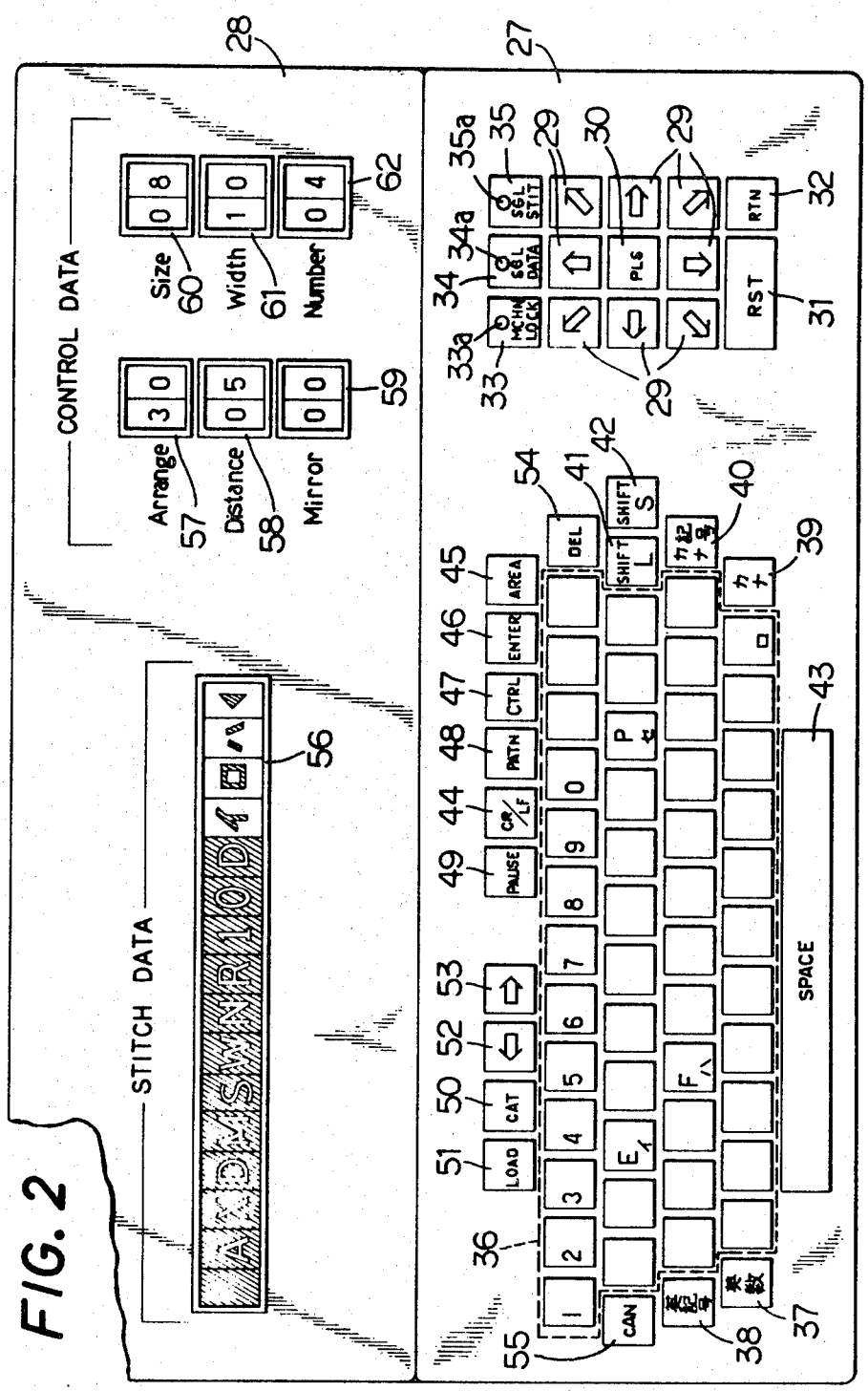
FIG. 2 is a view showing a keyboard and a display panel on a control device for use with the sewing machine.

There are shown in FIG. 2 the display panel 28, and the programming keyboard 27 which contains at its right-hand side portion: a plurality of jog keys 29 which, if pressed, generate signals to drive the second and third pulse motors 14 and 15 and thereby cause the embroidery frame 19 to move along the X and Y axes, and along a straight line having an angle of 45 degrees to both X and Y axes; an RLS key 30 to make operative the jog keys 29 if they are disabled when the embroidery frame 19 is moved out of a predetermined movable area or range; an RST key 31 to reset control circuits of the control device 25; an RTN key 32 to return the frame 19 to its predetermined position in the event the control device is turned off part way through an embroidering cycle due to a thread breakage or other troubles, and; MCHN LOCK key 33, SGL DATA key 34 and SGL STIT key 35 used to select a desired mode of control in which the sewing machine is controlled by the control device 25. The MCHN LOCK, SGL DATA and SGL STIT keys 33, 34 and 35 are provided with light emitting diodes 33a, 34a and 35a, respectively, which inform the operator of a currently selected mode of control.

On a left, central portion of the keyboard 27, are disposed a group of many data input keys 36 each having on its face a calibrated character or characters including English letters, numerals, and Japanese "katakana" letters and symbols each being used as an embroidery pattern. Desired types of the characters are selectable by pressing appropriate selector keys 37, 38, 39 and 40. It is so designed that the English letters and numerals are selected when none of these selector keys are activated. Before an English letter or numeral key is pressed, a SHIFT L key 41 or a SHIFT S key 42 is operated to select a size of the character. In addition to the group of data input keys 36, there are provided a SPACE key 43 to provide a space between characters selected by the keys 36, and a CR/LF key 44 to return the carriage for starting a new line of characters.

At a left, upper portion of the keyboard 27, are disposed the following program command keys: an AREA key 45 to set an area within which the embroidery frame 19 holding the workpiece 9 may be moved without interference with the needle 41; an ENTER key 46 to command termination of a specific programming operation or indicate the end of data input command codes; a CTRL key 47 to command the start of various programming command codes; a PATN key 48 to specify a block of unit pattern information corresponding to respective Chinese characters or other special patterns pre-stored in a memory device; a PAUSE key 49 to enter, during a programming operation, a command to temporarily stop the main drive motor 74a upon completion of an ambroidery stitch formed by the sewing machine; a CAT key 50 to enter a command code to file, in the memory device, combinations of pattern data command codes of frequently used letters, and; a LOAD key 51 to enter a command code to load the combined pattern data which has been filed by the CAT key. To the right of the CAT key 50, there are arranged display shift keys 52 and 53 to shift one digit to the left or right the data being displayed on a later described indicator provided on the display panel 28. The programming keyboard 27 further includes a DEL key 54 which is used to delete only the data that has been entered through any one of the previously explained data input keys when the key is pressed by mistake, and a CAN key 55 which is used to cancel all data that have been entered through any input keys pressed before the CAN key is operated.

The display panel 28 contains: a 16-digit, dot-matrix indicator 56 which displays data entered by an operator through the data input keys 36 and the program command keys; a 2-digit, 7-segment indicator 57 which displays numerical "Arrange" data specifying a direction and other factors of arrangement of unit stitch patterns such as letters and symbols entered through the command keys; a numeral indicator 58 which displays numerical "Distance" data specifying a distance between the said unit stitch patterns of letters and symbols; a numeral indicator 59 which displays numerical "Mirror" data directing symmetrical displacement of an embroidery pattern selected by the operator; a numeral indicator 60 which displays numerical "Size" data specifying a size of a unit stitch pattern selected by the operator; a numeral indicator 61 which displays numerical "Width" data specifying a desired ratio of a pre-stored unit stitch pattern (letter or symbol) width (oscillating amount of the needle 4 in the B direction) to a standard value, and; a numeral indicator 62 which displays numerical "Number" data specifying the number of stitches designated corresponding to each stitch zone of the said pre-stored embroidery letter or symbol which is divided into a plurality of stitch zones to prepare its unit pattern information.

Figure 3A:
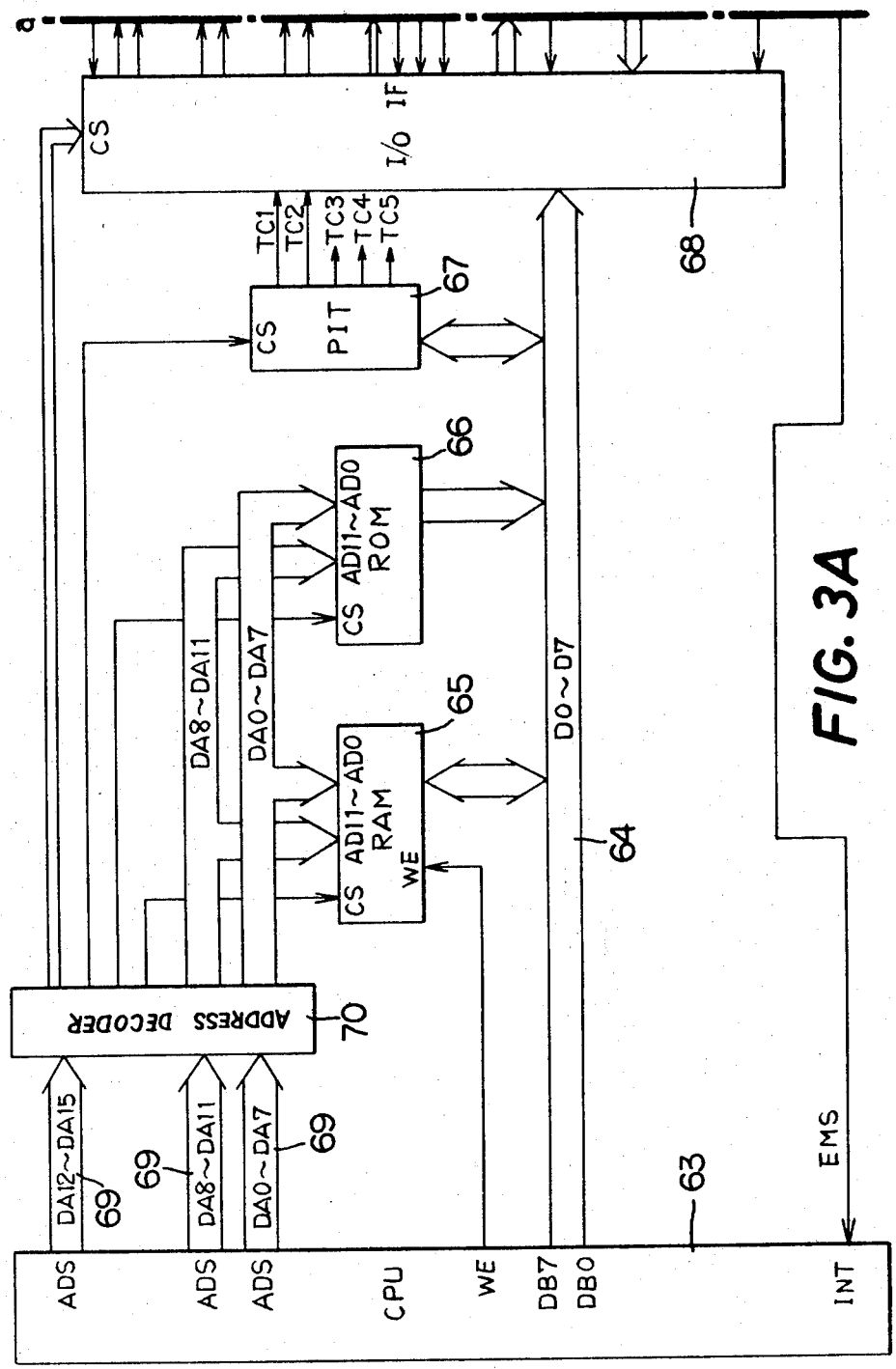
FIG. 3A and 3B, when assembled as shown in FIG. 38, is a block diagram representing an electric circuitry of the control device.
Figure 3B:
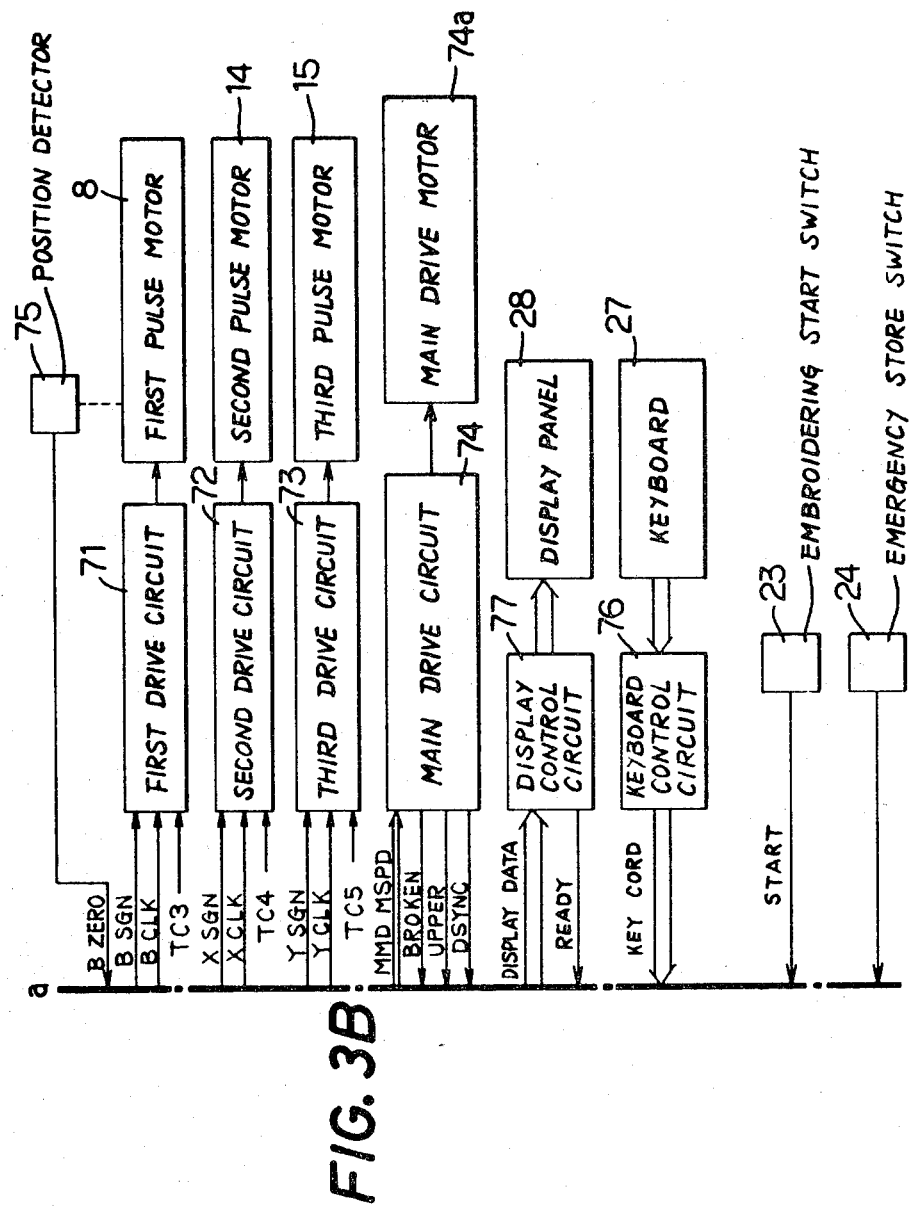
Figure 10:
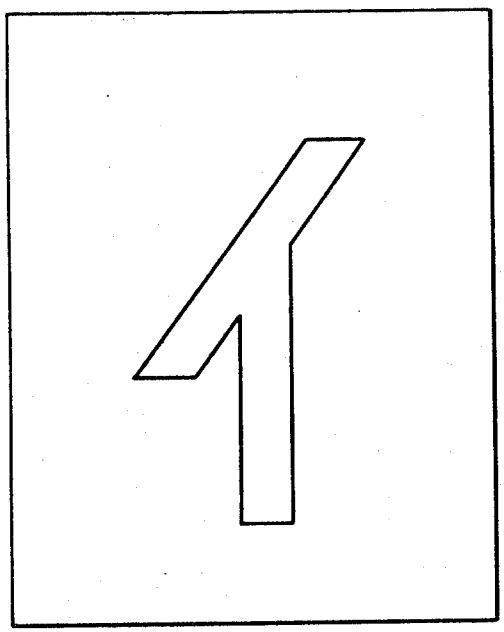
FIGS. 10 through 15 are diagrammatical views for explaining pattern data stored in the data bank and embroidery or stitch pattern to be formed according to the data.

Now, the arrangement of control circuits of the control device 25 of this invention is described referring to a block diagram in FIG. 3. A CPU 63, which is a central processing unit, has 16-bit address signal output terminals ADS, 8-bit data signal and instruction code signal input/output terminals DB0 through DB7, an interruption input terminal INT, etc., the input/output terminals DB0–DB7 being connected through a data bus 64 to a RAM 65 (random access memory), a ROM 66 (read-only-memory), a PIT 67 (programmable interval timer), and an I/O IF (input/output interface), while the address signal output terminals ADS being connected to an address decoder 70 through an address bus 69. Outputs of the address decoder 70 are connected to a chip selector terminal CS and/or address terminals AD0 through AD11 of such peripheral devices as the RAM 65, ROM 66, PIT 67 and I/O IF 68, whereby the addresses of those peripheral devices are allocated (as shown in FIG. 4). Connected to input/output terminals of the I/O IF 68 are: first, second and third drive circuits 71, 72 and 73 for driving the first, second and third pulse motors 8, 14 and 15, respectively; a main drive circuit 74 driving the main drive motor 74a and stopping the needle 4 at its fixed position; a position detector 75 detecting a reference zero position of the first pulse motor 8; a keyboard control circuit 76 generating key code signals corresponding to the individual keys on the keyboard 27; a display control circuit 77 for controlling each display element of the display panel 28, and; the embroidering start switch 23. The foregoing emergency stop switch 24 is connected to the terminal INT of the CPU 63.

The CPU 63, RAM 65, ROM 66, PIT 67 and I/O IF 68 constitute a stored program computer, and the input and output device connected to the I/O IF 68 are controlled in accordance with instruction codes pre-stored in the ROM 66. Signals to control the input and output devices connected to the RAM 65, ROM 66, PIT 67 and I/O IF 68 are arranged at respective addresses according to an address map presented in FIG. 4. A memory area ranging from address 0000 to address 7FFF is allotted to the ROM 66. In the area from address 0000 to 1FFF is stored a control program 66a which consists of instruction codes such as a main program and various subroutines controlling the control device 25, while the area from address 2000 to 7FFF is allocated as a data bank 66b wherein are stored many blocks of unit pattern information corresponding to various unit embroideries or unit switch patterns such as letters, symbols and pattern symbols available on the keyboard 27. (Refer to FIG. 5 and Table.)

TABLE

| Data in the data bank | Content of each data |
|---|---|
| MASK B data | The maximum needle oscillation amount in a unit pattern information |
| MASK X(Y) data | The maximum movement amount by a unit pattern information in X axis (Y axis) direction |
| NON-STITCH FEED data | A non-stitch feed code and position data of two apexes of a quadrangular stitch zone which is to be sewn immediately after the non-stitch feed |
| STITCH ZONE data | A stitch zone code and position data of two apexes of a quadrangular stitch zone |
| DATA END data | Code indicating termination of a unit pattern information |

To the RAM 65 is allotted a memory area ranging from address 8000 to address 9FFF in which there are provided groups of various working registers for performing control and arithmetic operations of the control device 25. (Refer to FIGS. 6 through 9.) The PIT 67 is given a memory area from address C000 to CFFF, and the I/O IF 68 is provided with a memory area from address D000 to FFFF, to the specified bits of which are allotted output signals from the PIT 67 and control signals to and from the input and output devices, those signals controlling the first, second and third drive circuits 71, 72 and 73.

Figure 11:
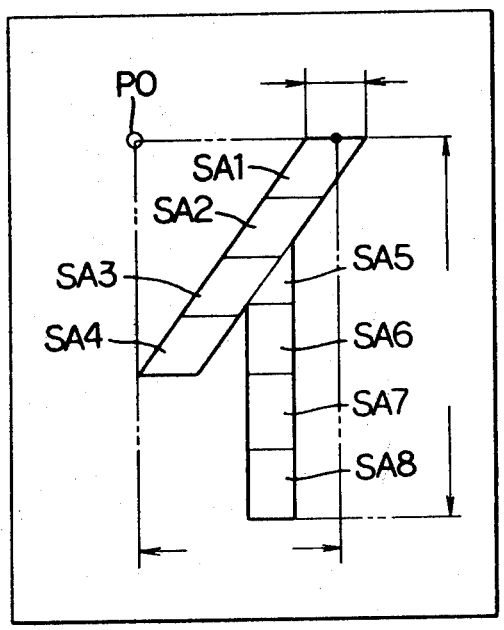
Figure 12:
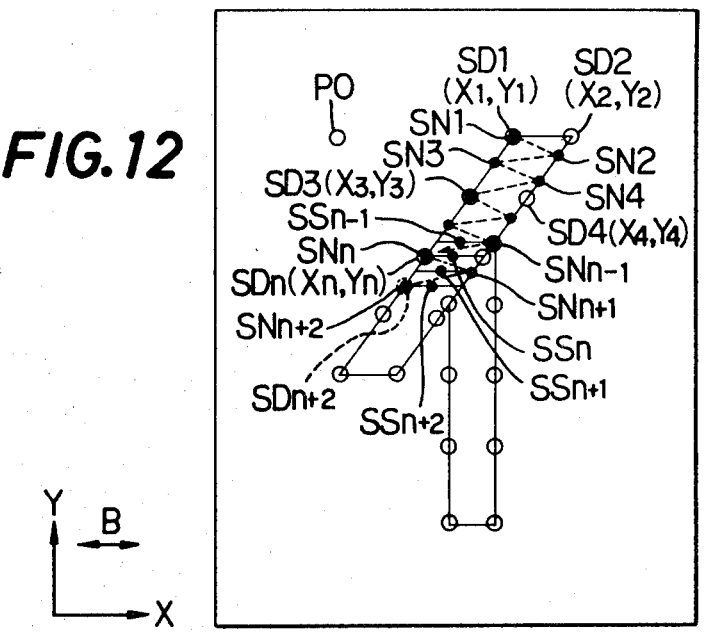

Referring now to FIGS. 5, and 10 through 12 as well as table which show contents of pattern data for forming a stitch pattern, which is stored in the data bank 66b, is explained hereunder. To prepare a unit pattern information i.e. a set of pattern data on a unit stitch pattern, for example, a "katakana" letter "イ": a reference zero position P0 of the pattern is first located; the letter pattern is then divided as shown in FIG. 11 into a proper number of triangular or quadrangular stitch zones (SA1, SA2, ... SA8); X and Y coordinate values [(X1, Y1), (X2, Y2), ... (Xn, Yn)] of each apex (SD1, SD2, ... SDn) of those stitch zones are calculated; and, the order of forming embroidery stitches of the letter pattern is properly determined. In this determined order, the entire set of data on a given letter pattern is prepared: First, data specifying a non-stitch feed from the pattern reference zero position P0 to the first stitch zone SA1 (no stitches being formed by this feed movement) is stored as a non-stitch feed data NF1 which includes a code to indicate the data is a non-stitch feed data and data on X and Y coordinates (X1, Y1) and (X2, Y2) of the apexes SD1 and SD2; then, data concerning the stitch zone SA1 is stored as a stitch zone data which includes a code to indicate the data is a stitch zone data, and data on X and Y coordinates (X3, Y3) and (X4, Y4) of the apexes SD3 and SD4 lying on the base line of the quadrangular zone SA1; and a series of data on the subsequent stitch zone data non-stitch feed data of the pattern are sequentially stored in the similar manner. The triangular stitch zone can be considered an extreme or special case of the quadrangular stitch zone, wherein two neighboring apexes of the latter are overlapped to each other to be one apex. In this connection, there are stored, at the first three bytes from the initial address of each block of unit pattern information for the said unit stitch patterns, three data; MASK B, MASK X and MASK Y, respectively. The data MASK B represents a maximum oscillating amount of the needle 4 along the B axis (X axis), and the data MASK X and MASK Y indicate maximum movement amounts along the X and Y axes of the embroidery frame 19 driven by the second and third pulse motors, respectively.

The working register area in the RAM 65 are provided at the specified addresses (8000 through 9FFF) with the following group of working registers 65a:

ABS X REG and ABS Y REG storing data of movement distances of the embroidery frame 19 from a later described absolute zero position along the X and Y axes, respectively (registers for storing current coordinates of the frame 19);

ABSO X REG and ABSO Y REG storing data of X and Y coordinates of the frame 19 at which formation of a combination stitch pattern is started (registers for storing coordinates of an embroidering start position);

AREA MODE REG storing data selecting a circular or rectangular mode for establishing geometry of an area within which the frame 19 is movable;

AREA R REG storing numerical data specifying a circular allowable area of movement of the frame 19;

AREA X-Y REG storing numerical data specifying a rectangular allowable area of movement of the frame 19;

CMND DATA REG storing sequentially various input command codes entered through the keyboard;

CMND SGN B REG, CMND SGN X REG and CMND SGN Y REG temporarily storing, at the time of forming each stitch, direction and angle of rotation of the first, second and third pulse motors 8, 14 and 15 due to movement commands;

CMND STORED REG recording that such directional and angular data have been transferred to the CMND SGN registers;

CTRL REG storing data entered through the keyboard or standard control data;

CTRL KEY REG storing temporarily standard control data or control data entered through the keyboard;

CYCLE END REG recording that the end of an operation cycle of the machine is reached;

CYCLE MODE REG storing data selecting a mode of operation of the control device, viz., data input mode or jog mode;

FILE DATA REG filing control data and command codes of letters or symbols entered through the keyboard i.e. programmed data;

FILE TABLE REG recording addresses of the FILE DATA REG at which data are stored;

FILE ADR REG recording addresses of the FILE TABLE REG entered through the keyboard;

FROM SEW REG recording that the control device is placed in the sewing mode;

ISM REG recording an internal synchronization mode;

JOG TIM REG recording that a JOG timer is in operation in a JOG key routine;

KEYIN DATA REG sequentially storing standard control data and codes entered through the keyboard;

L ADR KEY REG storing addresses of the KEYIN DATA REG from which the said control data and codes are extracted or read out;

L ADR CMND REG recording addresses of the CMND DATA REG from which data are extracted;

L ADR SEW REG storing recording addresses of SEW DATA REG from which sew data are extracted;

L ADR BANK REG recording addresses of the data bank 66b from which desired pattern data are extracted;

MCHN LOCK REG recording ON state of the light emitting diode 33a (machine lock mode);

MMD REG recording driving conditions of the main drive motor;

OUT B REG, OUT X REG and OUT Y REG counting the number of pulses applied to the first, second and third drive circuits according to the directional and angular command data stored in the said CMND SGN B REG, CMND SGN X REG and CMND SGN Y REG;

ON STIT REG recording that the control device is currently controlling a sewing operation;

ON ALL RTN REG recording that the frame 19 is in returning to an embroidering start position with the RTN key 32 activated while the light emitting diodes 34a and 35a are both in the OFF state;

ON RTN REG recording that the frame 19 is reversely moving with the RTN key 32 activated while the diodes 34a and 35a are in the ON state;

PATN KEY REG storing numerical data entered through the key-board after the PATN key 48 has been pressed;

SEW DATA REG storing data representing positions of stitches constituting a stitch pattern;

S ADR SEW REG storing addresses of the SEW DATA REG at which the stitch position data are stored;

S ADR KEY REG recording addresses of the KEYIN DATA REG at which the codes entered through the keyboard are stored;

S ADR CMND REG recording addresses of the CMND DATA REG at which the command codes entered through the key-board are stored;

SGL DATA REG recording ON state of the light emitting diodes 34a (SGL DATA MODE);

SGL STIT REG recording ON state of the light emitting diodes 35a (SGL STITCH MODE);

and other registers.

Figure 17:
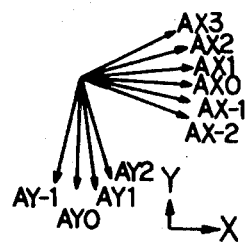
FIGS. 17 through 21 are schematic view for explaining "Arrange" data to be used for the machine.
Figure 18:
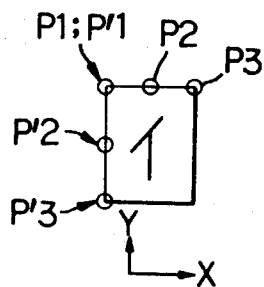
Figure 19:
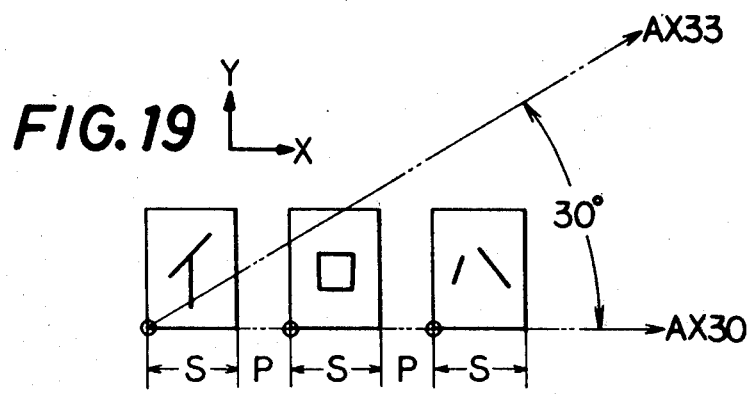

Having described above the arrangement of the control device 25, the operation of the device is now explained in detail according to flow charts given in FIGS. 22 through 42 which present an example of successively forming on the workpiece 9 Japanese "katakana" letters "イ", "ロ" and "ハ" as a combination stitch pattern "イロハ" based on various operations by the operator through the keyboard 27. In this connection, the "Arrange" data specifying the direction of arrangement of the said letter patterns successively formed on the workpiece, "Size" data specifying the size of each letter pattern, "Width" data specifying the ratio of width or thickness of each letter to a pre-determined standard value (oscillating amount of the needle 4), "Mirror" data directing a symmetrical displacement of the letters, and "Number" data specifying the number of stitches to be formed in each of divided stitch zones of each letter, are designated by pre-determined standard control data, while on the other hand, the "Distance" data specifying a distance between the letters is determined by data entered through the keyboard by the operator. Now, the standard control data established for this particular embodiment of the control device are described: As shown in FIGS. 17-19, the Arrange data (AX30) specifies the direction of arrangement of the letters "イ", "ロ" and "ハ" so that reference point P'3 of the letters at the left, bottom corner of a rectangle enclosing or accommodating each letter are placed on a straight line indicated by an arrow AX0. The Size data (Size 08) selects 8 mm and 10 mm as dimensions of each letter as measured along the X and Y axes, respectively. The Distance data (Distance 10) selects 10 mm as a distance between the letters. The Width data (Width 1.0) signifies the desired ratio of width to the standard value is 1.0, that is, the width of the letters is not changed from the standard value. The Mirror data (Mirror 00) means no symmetrical displacement of the letters will not take place. And, the Number data (Number 04) permits four stitches to be formed in each of the stitch zones constituting each letter.

Figure 25:
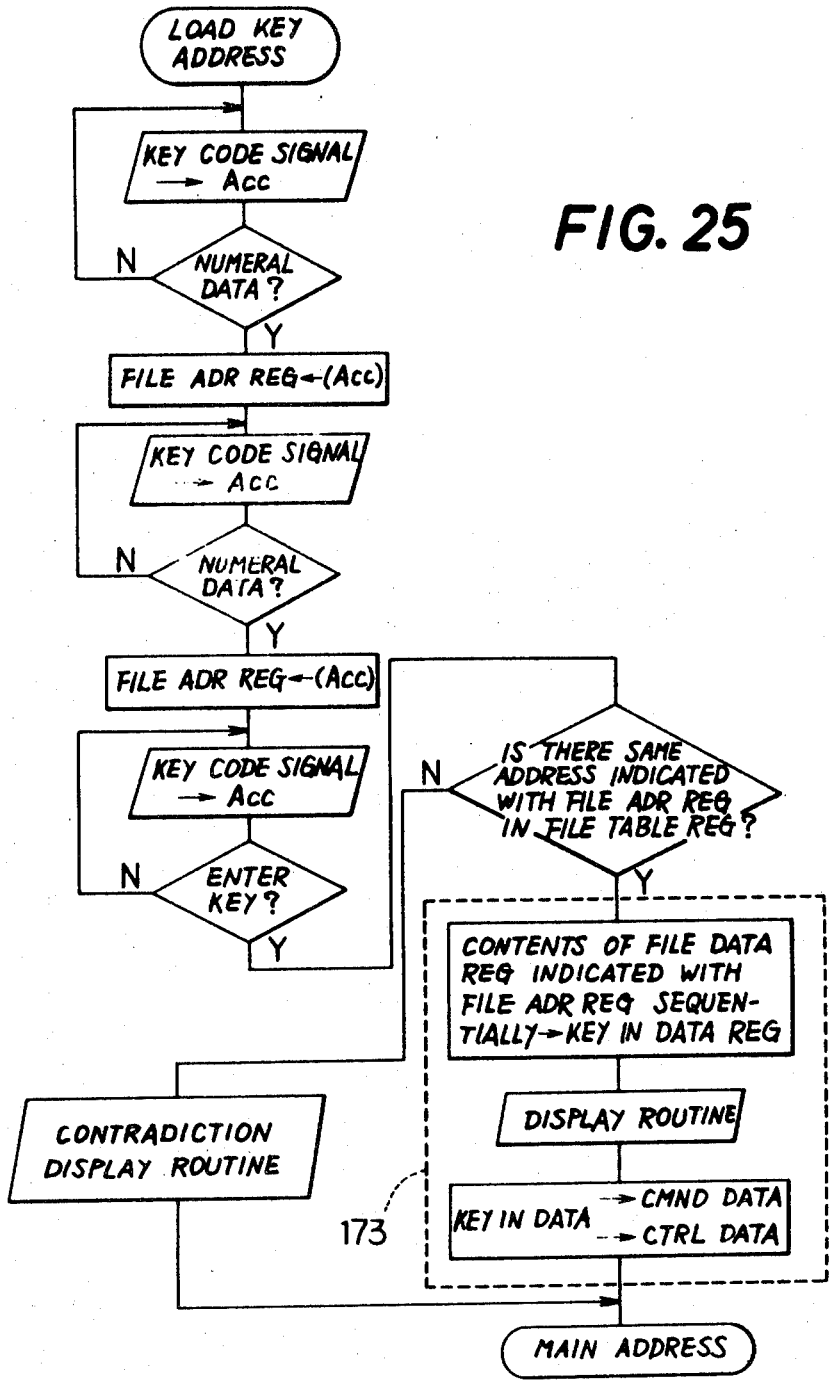
FIG. 25 is a flow chart showing a LOAD KEY routine of the control program.
Figures 26, 27, 28:
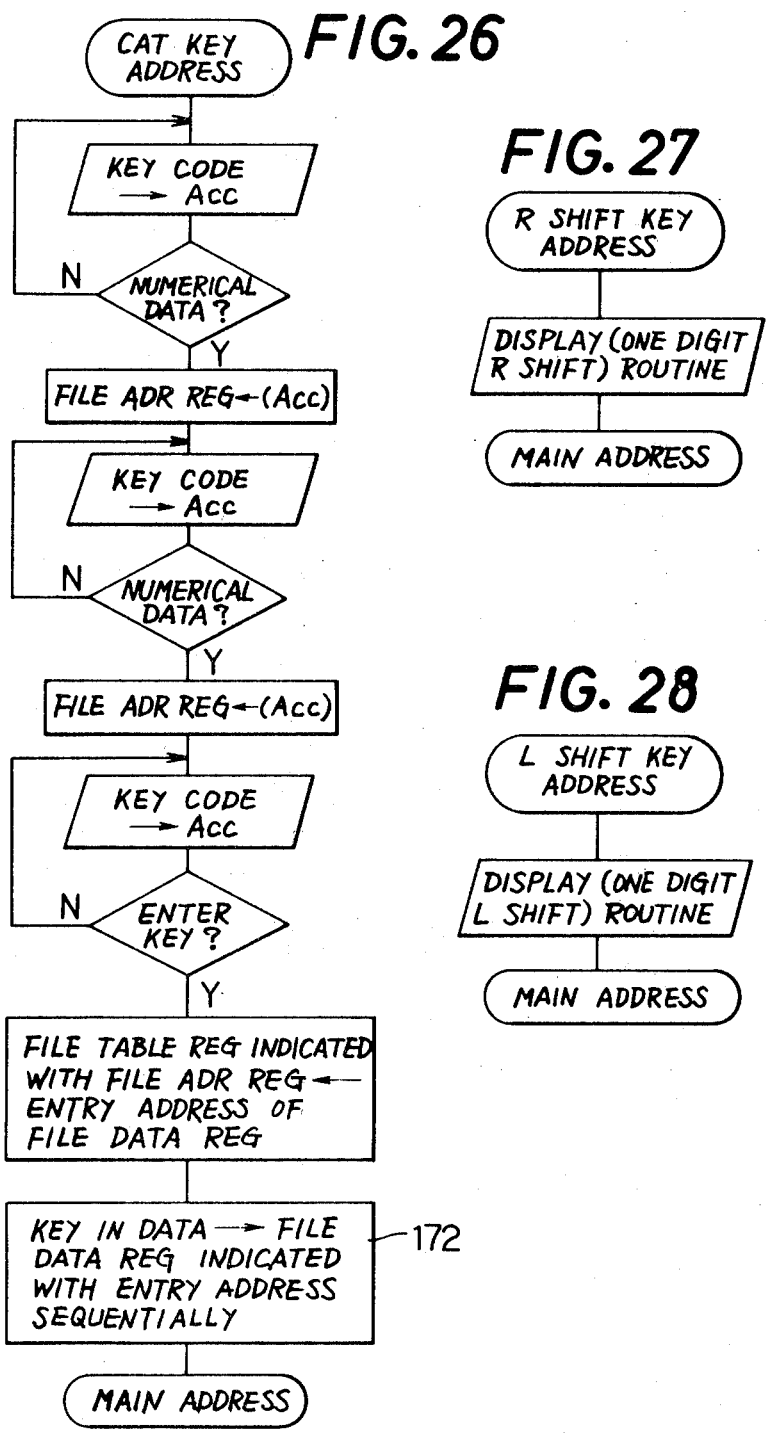
FIG. 26 is a flow chart showing a CAT (catalogue) KEY routine of the control program.
FIG. 27 is a flow chart showing an R (right) SHIFT KEY routine of the control program.
FIG. 28 is a flow chart showing an L (left) SHIFT KEY routine of the control program.
Figure 29A:
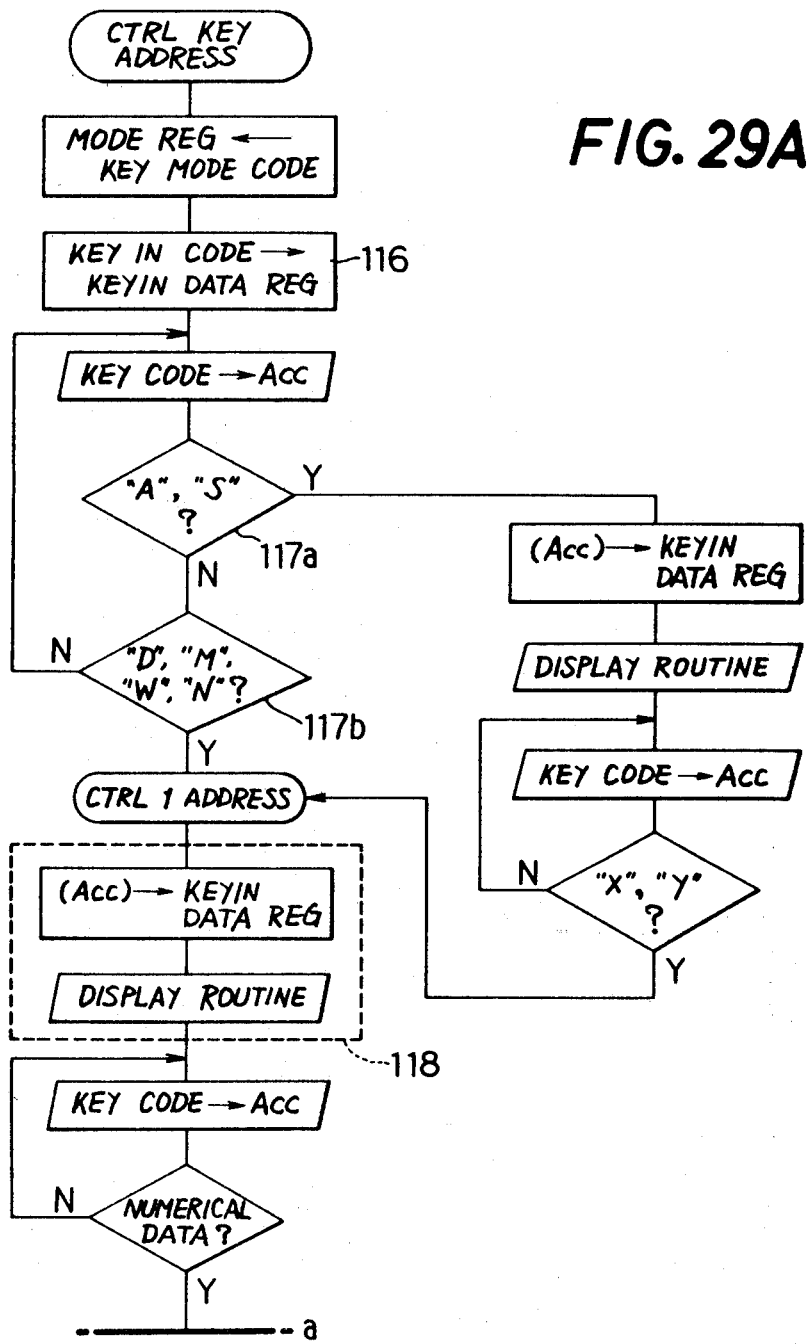
FIGS. 29A and 29B, when assembled as shown in FIG. 40, is a flow chart showing a CTRL (control) KEY routine of the control program.
Figure 29B:
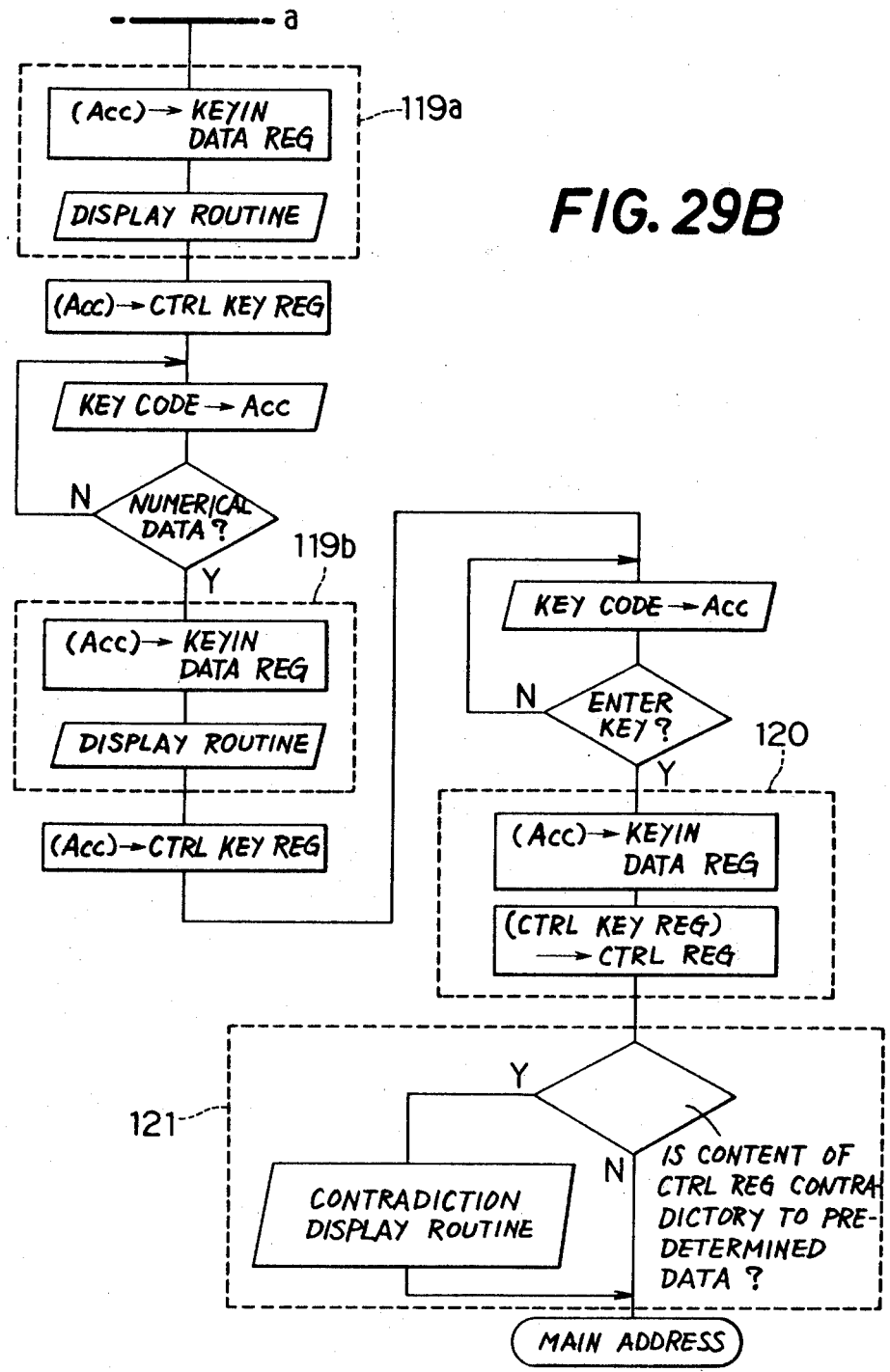

When power is initially applied to the control device 25, the control program shown in FIG. 25 starts at a start address 100, and goes sequentially up to a monitor loop 106 through: an initializing routine 101; a display routine 102; an automatic B-axis zero return routine 103; a data transfer and display routine 104, and; a main address 105. The initializing routine 101 serves to initialize the various working registers, and input and output devices. The display routine 102 is provided to keep illuminated for a preset time interval all indicator elements of the 16-digit indicator 56 and numeral indicators 57 through 62 on the display panel 28, and the light emitting diodes 33a, 34a and 35a on the keyboard 27. The automatic B-axis zero return routine 103 functions to reset the first pulse motor 8 to its predetermined zero position at which the oscillating amount of the needle 4 adjustable by the adjusting mechanism 7 connected to the motor is zero. The data transfer and display routine 104 acts to transfer the standard control data stored in the KEYIN DATA REG to the CTRL REG and display such standard control data on the indicators on the display panel 28. The monitor loop 106 which monitors whether any of the keys has been activated or not, is then executed repeatedly until a key is operated. In summary of the operation of the control device 25 in this step, all indicator elements of the display units are illuminated for the preset length of time by the display routine 102; the oscillating amount of the needle 4 is set to zero by the automatic B-axis zero return routine 103, and; letters "AX", "S", etc. which represent the command codes for the standard "Arrange", "Size" and other control data, are displayed on the 16-digit, 28-dot matrix indicator 56 and appropriate numerical values of such control data are displayed on the numeral indicators 57 through 62 by the data transfer and display routine 104. Those letters representing the command codes which are displayed on the dot-matrix indicator 56 are white characters in the black, as shown in FIG. 2, so as to distinguish them from the later described stitch pattern letters which are displayed on the same indicator as black characters in the white.

Figure 35:
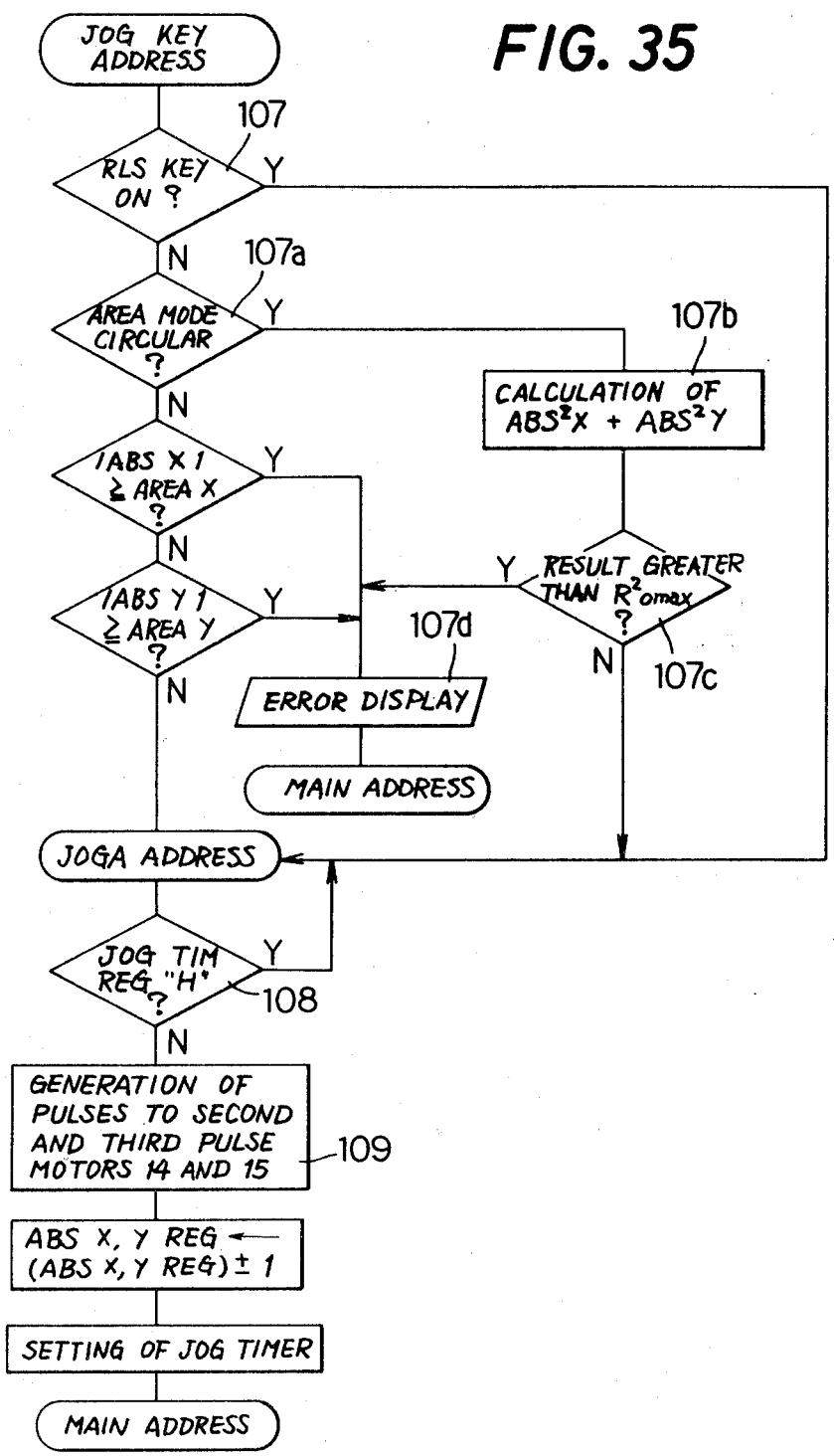
FIG. 35 is a flow chart showing a JOG KEY routine of the control program.
Figure 36A:
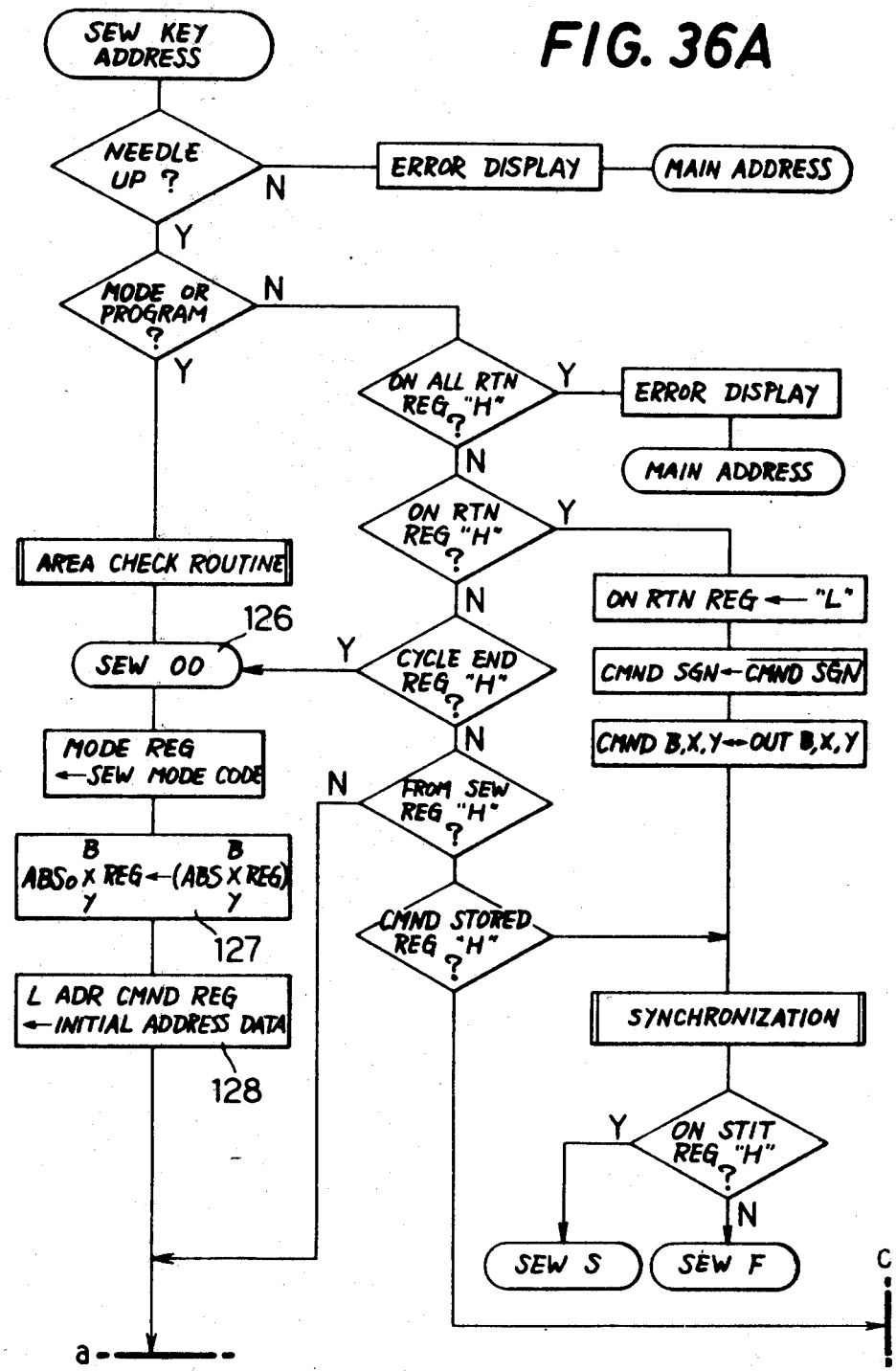
FIGS. 36A, 36B, 36C, 36D, 36E and 36F, when assembled as shown in FIG. 41, is a SEW KEY routine of the control program.
Figure 36B:
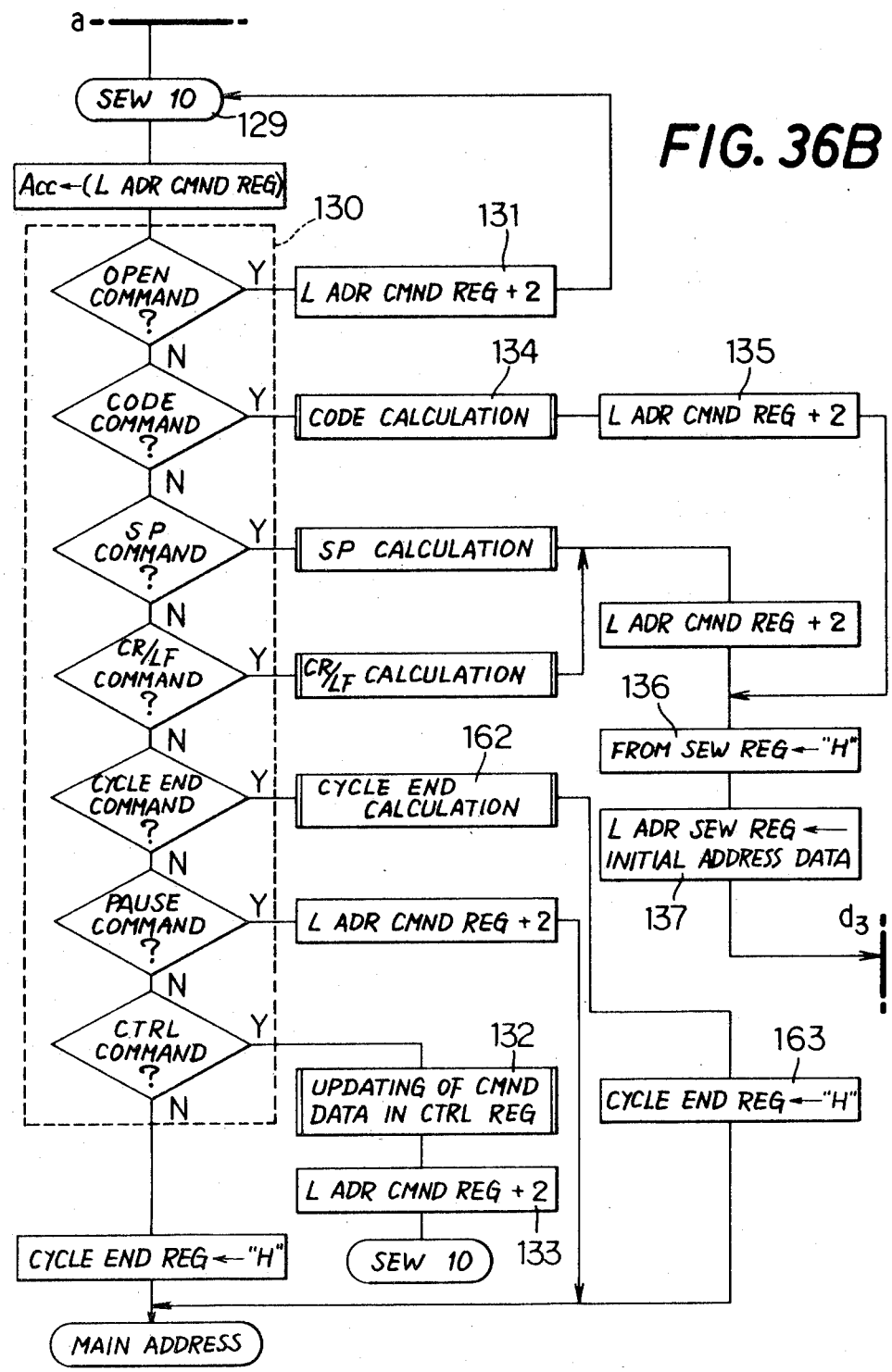
Figure 36C:
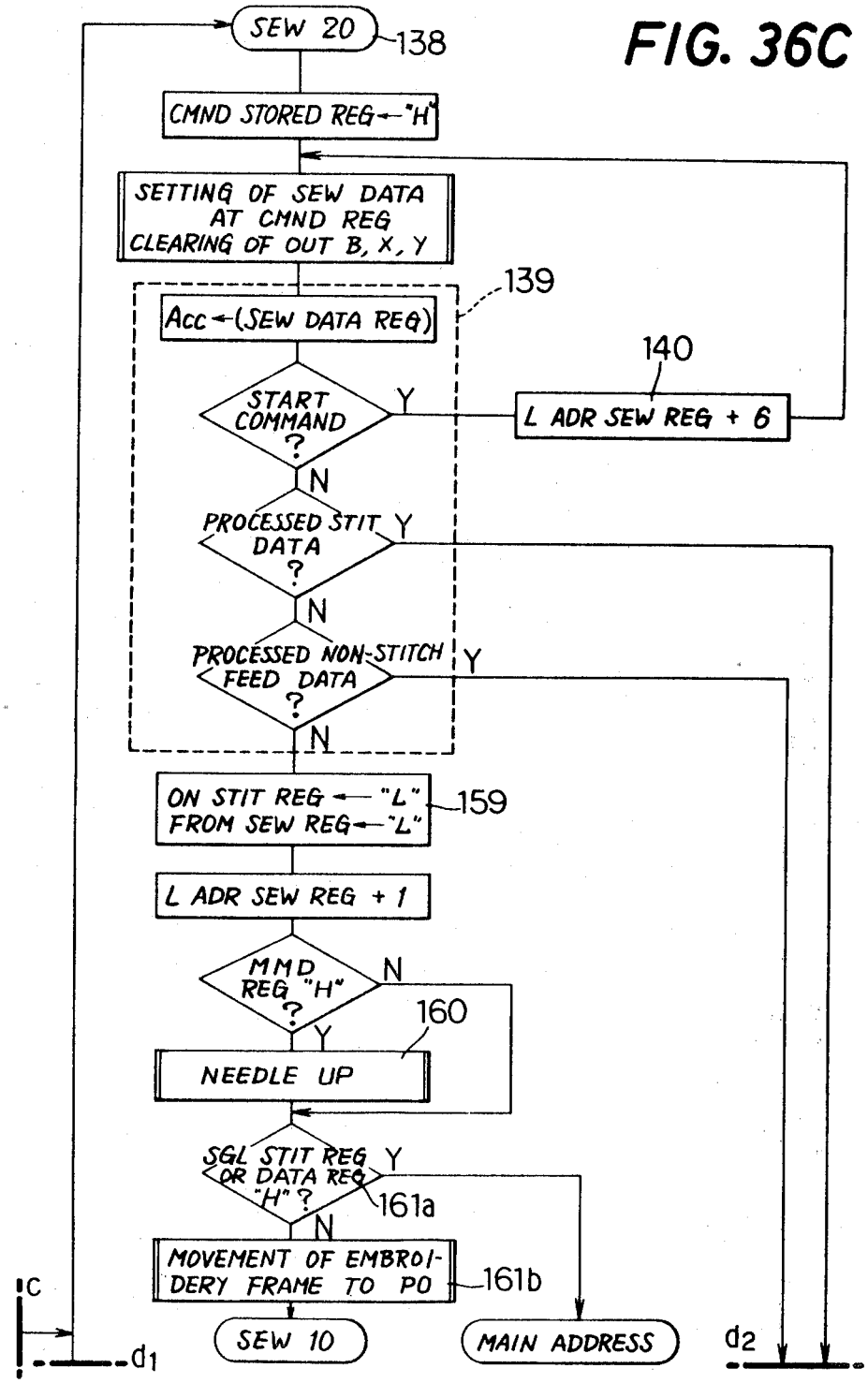
Figure 36D:
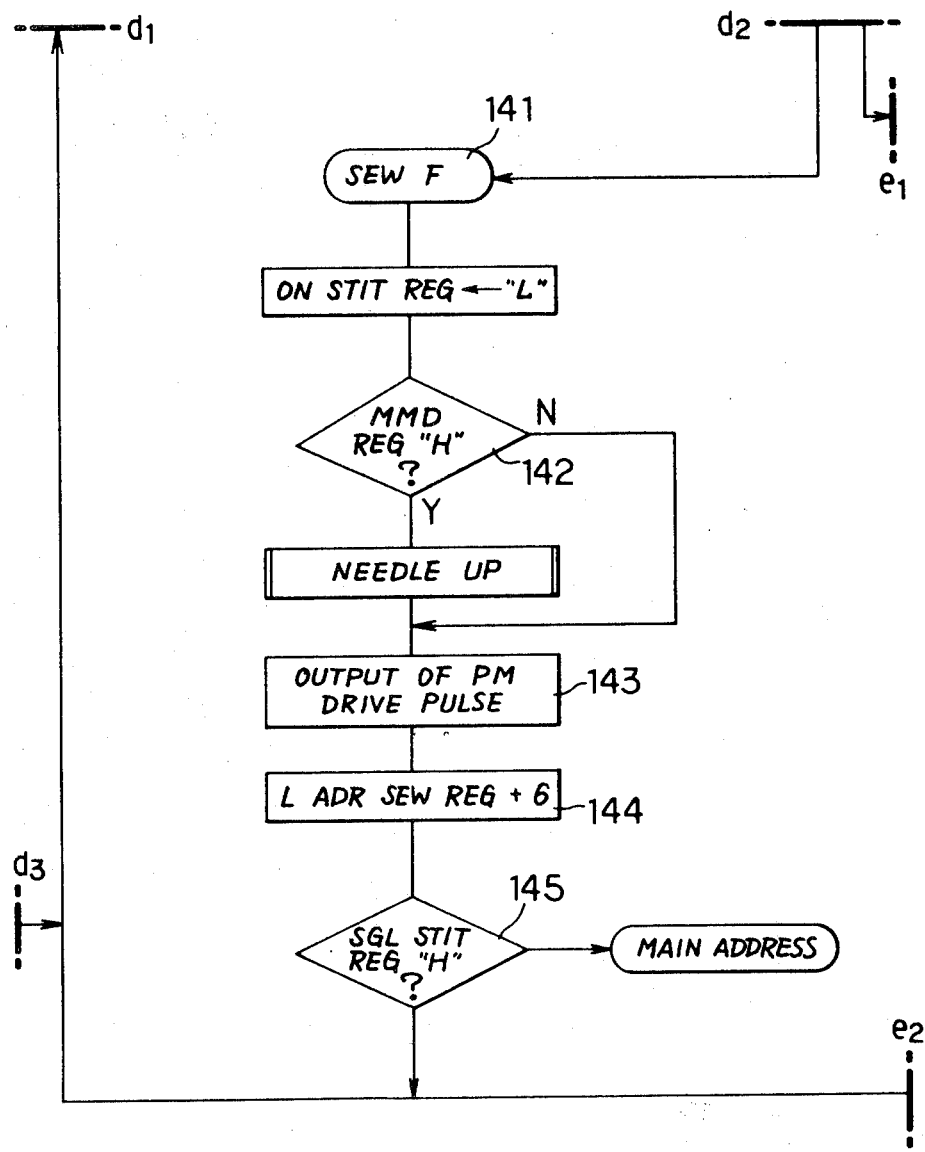
Figure 36E:
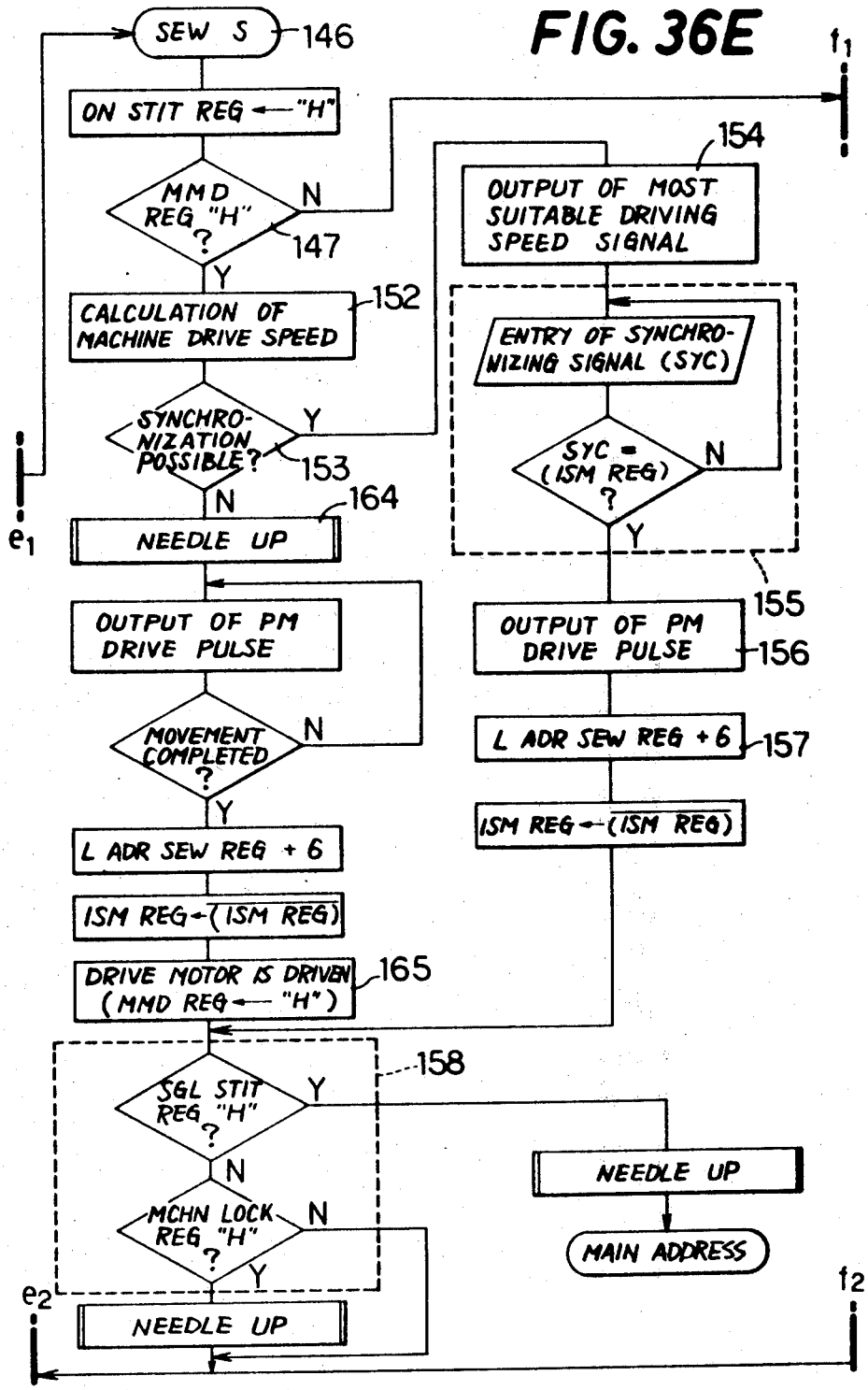
Figure 36F:
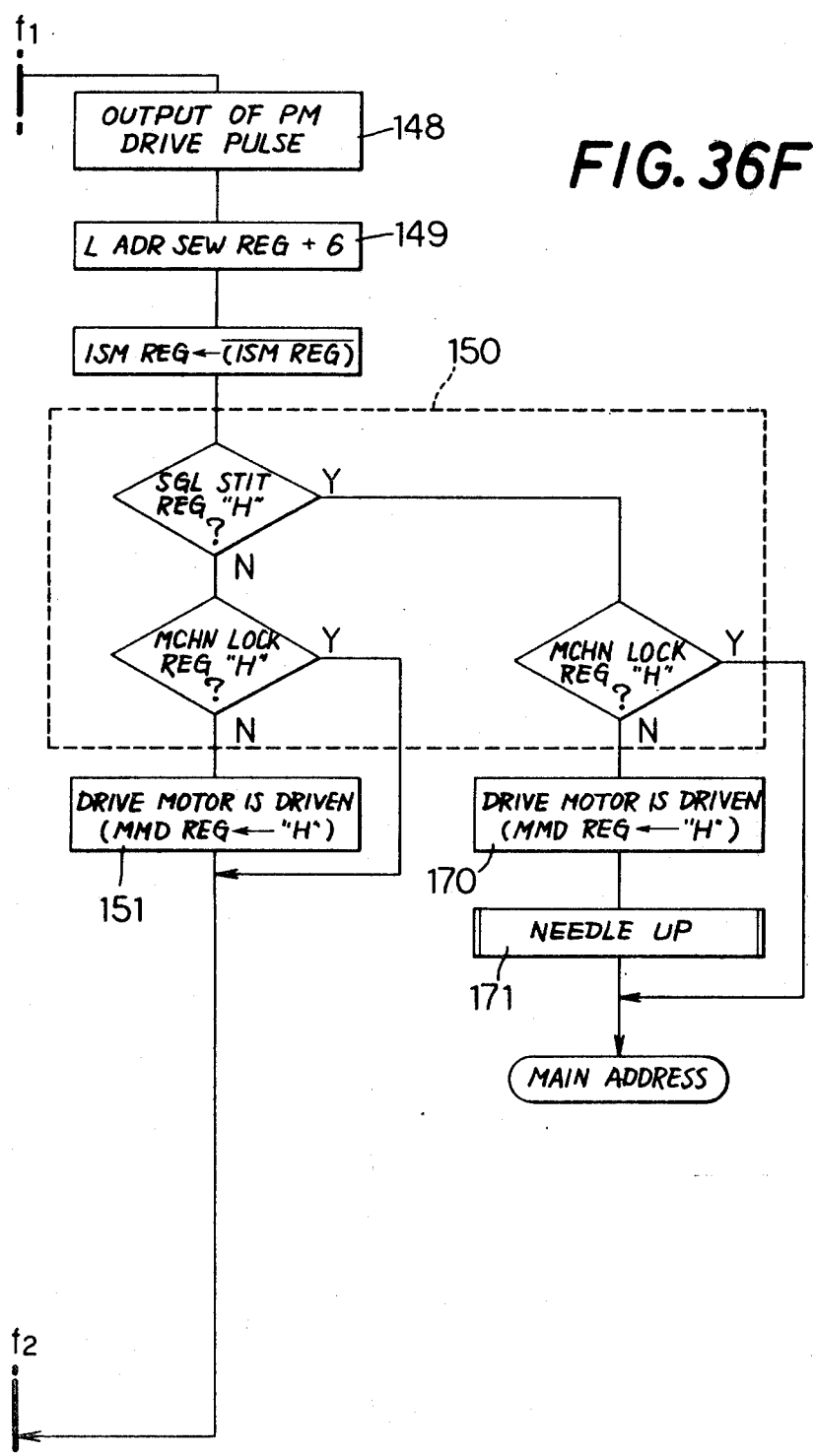

By simultaneously pressing one of the jog keys 29 and the RLS key 30 in the next step, the control program leaves the monitor loop 106, and sequentially advances to: a routine 107 shown in FIG. 35 which checks ON-OFF state of the RLS key; a JOGA address; a routine 108 which checks memory contents of the JOG TIM REG for high-low (H-L) levels, and; a routine 109 which causes the second and third drive circuits 72 and 73 to generate pulses to drive the second and third pulse motors 14 and 15. From the routine 109, the control program returns to the main address through other routines, and the monitor loop 106 is again executed repeatedly. In this step, consequently, the second and/or third pulse motors 14 and 15 are started upon the simultaneous press of the jog and RLS keys 29 and 30, and the workpiece 9 held by the frame 19 is moved relative to the needle 4. If the keys 29 and 30 are kept pressed by the operator at this time, the control program executes the routine 109 repeatedly after taking the same path as described above, and as a result, the second and/or third drive circuits 72, 73 present, for a length of time fixed by the JOG TIM REG, drive pulses at a given time interval substantially determined by an instruction execution time of the program set for this control device, whereby the frame 19 is moved continuously in a selected direction. The frame 19 may be moved so that a supposed center of the substantially annular inner frame 20 is put into alignment with the centerline of the needle 4, by properly using the RLS key 30 and selectively operating the jog keys 29 which are selected depending upon directions of movement that are indicated by arrows on the keys.

Figure 16:
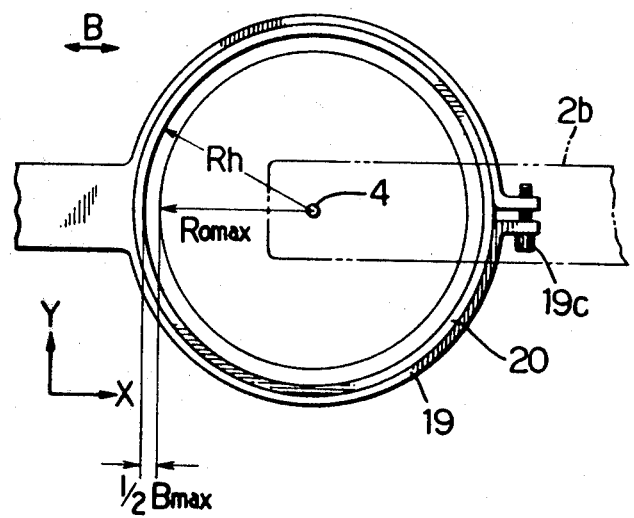
FIG. 16 is a plan view showing a position of a workpiece or an embroidery frame of the machine relative to a needle of the machine in setting an area within which the frame is allowed to move.
Figure 24:
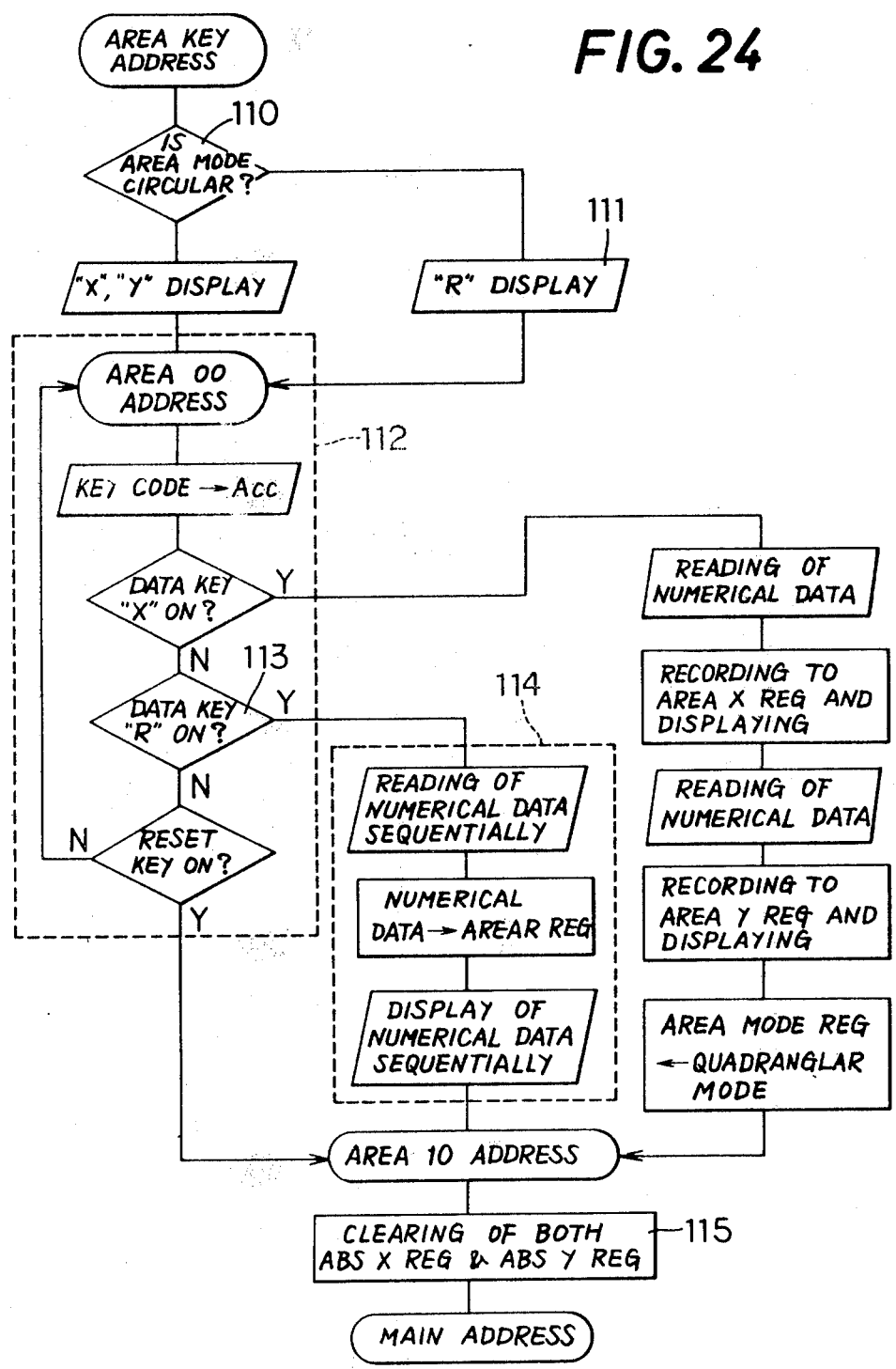
FIG. 24 is a flow chart showing an AREA KEY routine of the control program.

If the AREA key 45 is pressed after the frame 19 has been moved to the point at which the supposed center of the substantially annular inner frame 20 is aligned with the center of the needle 4 as shown in FIG. 16, the control program jumps from the monitor loop 106 to the AREA key address shown in FIG. 24, and goes up to a monitor loop 112 through: a routine 110 which checks the AREA MODE REG for a selected mode (circular or rectangular) of allowable movement area of the frame 19; a routine 111 which causes the dot-matrix indicator 56 to display an alphabet "R" indicating that the allowable movement area of the frame 19 is circular or round in configuration, and; an AREA 00 address. The monitor loop 112 which serves to monitor ON-OFF state of the AREA key, is executed repeatedly. Now, the frame 19 is located at its absolute zero position.

Then, the operator calculates a numerical value that represents an area or range within which the frame 20 is allowed to move relative to the needle 4, i.e., a distance "Romax" which is a difference between a distance "Rh" as measured from the needle 4 to the inside diameter of the inner frame 20, and a half of a maximum oscillating distance "Bmax" of the needle 4 (Romax=Rh−½Bmax). If the "Romax" is 10 cm, for example, the operator enters data "R", "1" and "0" through the appropriate data input keys 36. With this data entry operation through the keys, the control program leaves a routine 113 in the monitor loop 112 and goes to a routine 114 which serves to store the entered numerical data at specified addresses of the AREA REG and display the same on the dot-matrix indicator 56, then to a routine 115 which acts to clear the ABS X REG and ABS Y REG, and finally returns to the main address 105. Accordingly, the dot-matrix indicator 56 is currently displaying the area setting data "R10" in addition to the standard control data "AX", "S", "D", "W", "M" and "N". Further, since the ABS X REG and ABS Y REG have been cleared by the routine 115, the absolute zero position of the frame 19 with respect to the needle 4 has been established and therefore subsequent relative movements of the frame 19 from the absolute zero position is monitored by the ABS X REG and ABS Y REG to prevent the frame 19 from moving beyond the allowable movement area established with respect to the needle 4. Now, the allowable movement area of the frame has been set.

In the next step, the operator determines an embroidering start position on the workpiece 9 held by the frame 19, which is different from the previously established absolute zero position, particularly depending upon whether an embroidery pattern to be formed on the workpiece 9 extends in the longitudinal direction (along the X axis) or in the cross direction (along the Y axis), and he then operates the appropriate jog key 29. Now, the control program jumps from the monitor loop 106 to the JOG key address (FIG. 35) as previously described, from which the control program finally returns to the main address 105 through routines 107a, 107b, 107c and JOGA addresses, routines 108 and 109, etc. The routine 107a checks contents of the AREA MODE REG. The routine 107b calculates the sum of data in the ABS X REG raised to the second power and data in the ABS Y REG raised to the second power, viz., [(ABS X)$^2$+(ABS Y)$^2$], and a value "Romax" raised to the second power, viz., (Romax)$^2$. The routine 107c compares the two obtained values to check to see if [(ABS X)$^2$+(ABS Y)$^2$] is greater than (Romax)$^2$. Thereafter, the control program repeats the above routines in sequence if other jog keys 29 are pressed.

Thus, by operating selectively two or more jog keys 29, the frame 19 may be moved to the embroidering start position which best suits a particular pattern to be embroidered on the workpiece 9 held by the frame. In the event a relative movement amount of the frame 19 from its absolute zero position exceeded a value set and stored in the AREA REG, the control program would return to the main address from the routine 107c through a routine 107d which causes each data on the dot-matrix indicator 56 to flicker, and therefore the second and third pulse motors 14 and 15 would not be driven, nor the frame 19 be moved any more, whereby there would be no chance of interference between the frame 19 and the needle 4. Now, the frame 19 is located at the embroidering start position.

If it is desired to change a distance between the letter patterns to 5 mm (Distance 05), for example, from the said value of 10 mm (Distance 10) specified by the predetermined standard control data, the operator presses sequentially the CTRL key 47, data input keys 36 "D", "0" and "5", and ENTER key 46. Then, the control program jumps from the monitor loop 106 to a CTRL key routine shown in FIG. 29 through a CTRL key address. With this data entry operation, the following routines are sequentially executed before the control program finally returns to the main address and the monitor loop 106 is again repeatedly executed: a routine 116 which stores the key code signal of the CTRL key 47 in the KEYIN DATA REG; routines 117a and 117b which check the keys operated after the CTRL key 47; a CTRL 1 address; a routine 118 which stores the key code signals of the keys operated after the CTRL key 47 in the KEYIN DATA REG and displays the numerical data corresponding thereto on the dot-matrix indicator 56; routines 119a and 119b which store in the KEYIN DATA REG the key code signals generated through operation of the numeral keys and display the numerical data on the indicator 56; a routine 120 which stores in the KEYIN DATA REG the key code signal generated through operation of the ENTER key 46 and at the same time transfers to the CTRL REG the numerical data which has been stored in the KEYIN DATA REG by the routines 119a and 119b, and; a routine 121 which checks to see if the operator's operation through the above keys to change the distance control data or each of other control data such as arrange data is contradictory to the pre-determined data.

Consequently, the key code signals of the keys operated to make the above change of the standard distance control data are sequentially stored in the KEYIN DATA REG, and the numerical data entered through those keys are stored, instead of the originally stored data, in the CTRL REG (FIGS. 6 through 8), and the letter "D" is displayed on the dot-matrix indicator 56, following the non-changed data, that is, the indicator 56 is presently displaying "AX, S, D, W, M, N, R10, D". Further, the numerical value "10" which has been displayed on the numeral indicator 58 is now changed to "05". Now, the desired change in the distance data has been completed.

Figure 31:
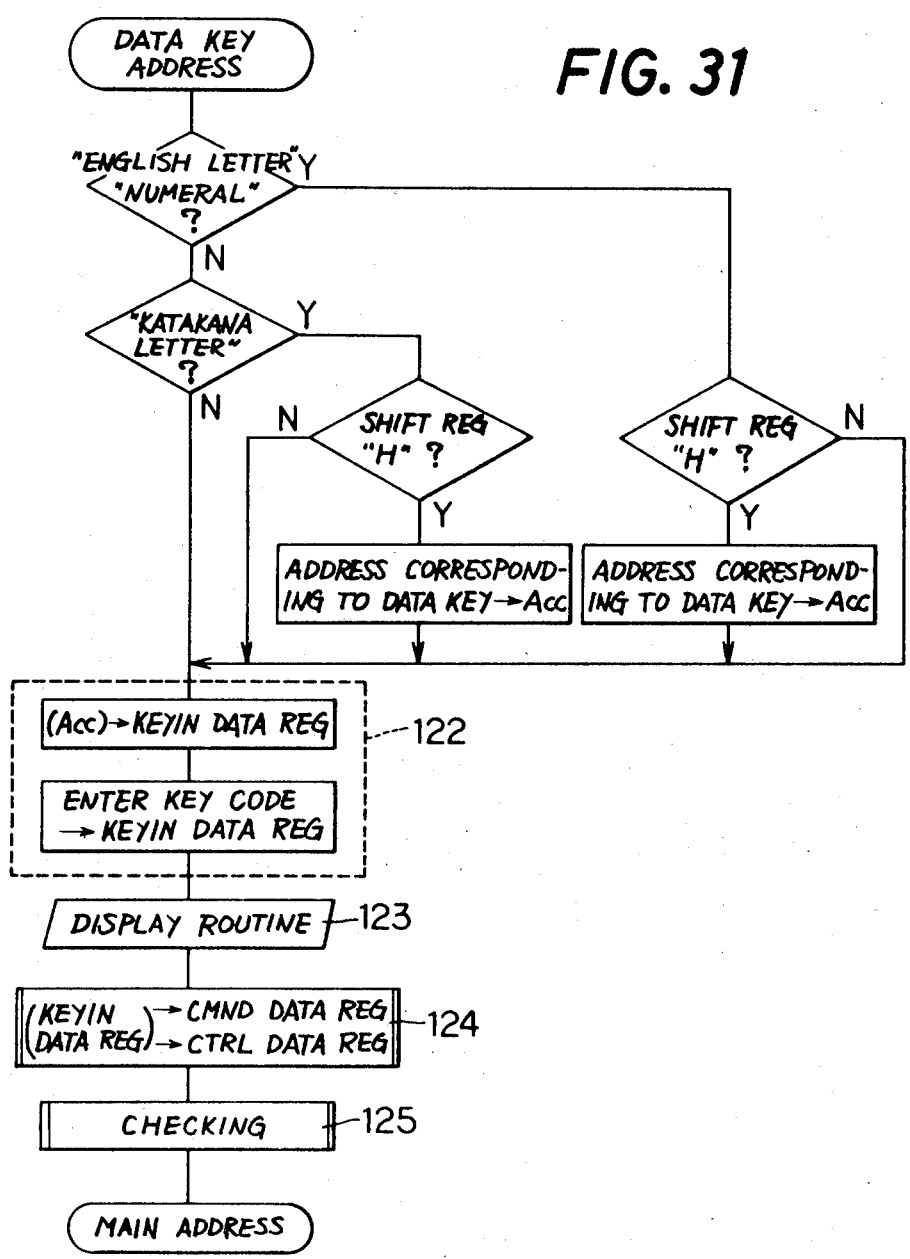
FIG. 31 is a flow chart showing a DATA KEY routine of the control program.
Figure 32:
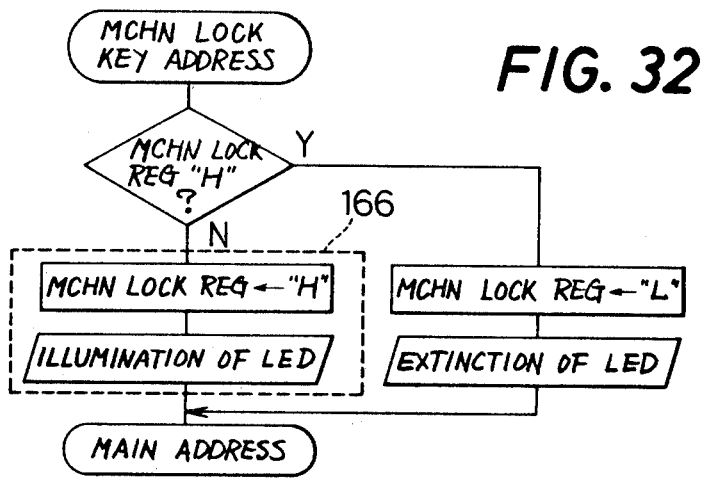
FIG. 32 is a flow chart showing a MCHN (machine) LOCK routine of the control program.
Figure 33:
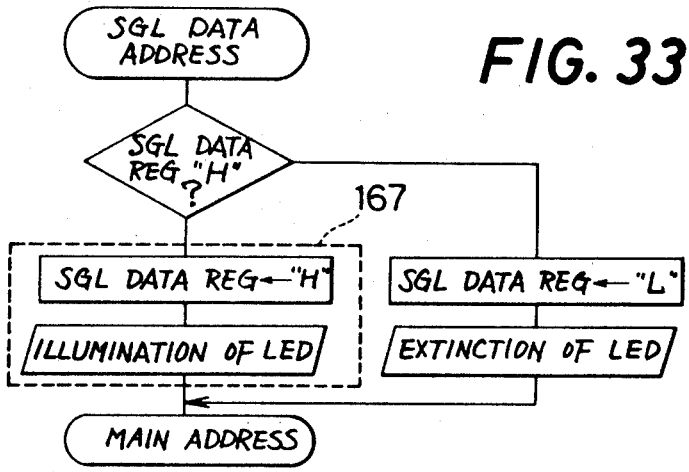
FIG. 33 is a flow chart showing a SGL (single) DATA routine of the control program.
Figure 34:
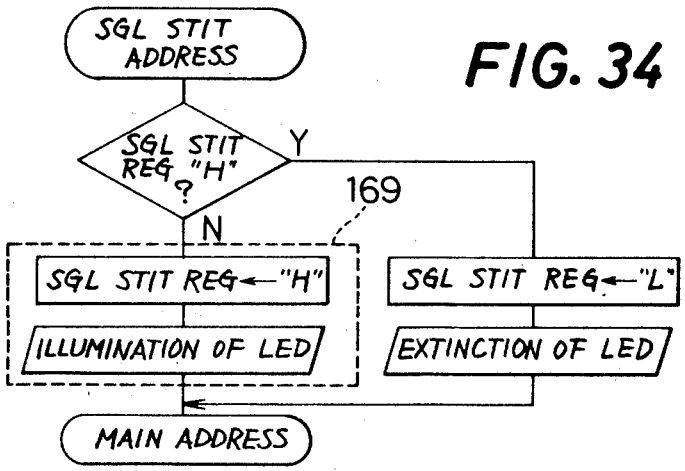
FIG. 34 is a flow chart showing a SGL STIT (single stitch) routine of the control program.

Nextly, by pressing each of the Japanese "katakana" letter keys 36 "イ", "ロ" and "ハ" for selecting those letters to form the combined letter embroidery "イロハ" on the workpiece 9, the control program jumps from the monitor loop 106 to a DATA key address shown in FIG. 31 and the following routines are sequentially executed before it returns to the monitor loop 106 through the main address: a routine 122 which stores the key code signal of the letter key in the KEYIN DATA REG; a routine 123 which displays the corresponding letter on the dot-matrix indicator 56; a routine 124 which transfers the data stored in the KEYIN DATA REG to the CMND DATA REG and the CTRL DATA REG; a routine 125 which extracts the unit pattern information corresponding to the keyed-in letter from the data bank 66b within the ROM 66 and checks to see if the movement amounts of the frame 19 in forming the letter pattern on the workpiece 9 according to the above-mentioned control data are smaller than the numerical values previously set to establish the allowable movement area. The path from the monitor loop 106 back to the same via the above explained routines is taken each time the three different letter keys are sequentially pressed, that means, the control program repeats execution of the path three times. After the three times of repetition of that path, the monitor loop 106 is again executed repeatedly.

Accordingly, the dot-matrix indicator 56 is finally displaying, as shown in FIG. 2, "AX, S, D, W, M, N, R10, D, イ, ロ, ハ" through execution of the routine 123, and the command codes entered through the letter keys are sequentially stored in the KEYIN DATA REG and CMND DATA REG (Refer to FIGS. 6 through 8). Furthermore, through execution of the routine 125, the maximum amounts of X and Y movements of the frame 19 necessary for embroidering according to the unit pattern information selected by the letter keys from the data bank 66b, are calculated, and if the calculated values were greater than the numerical values previously set to establish the allowable movement area of the frame, the dot-matrix indicator 56 would become flickering to inform the operator that an operating error has been made. Now, the desired blocks of unit pattern information has been selected.

If the operator presses, in this condition, the embroidering start switch 23 to initiate the embroidering cycle to form the said Japanese "katakana" letter patterns "イ", "ロ" and "ハ" on the workpiece, the control program jumps from the monitor loop 106 to a SEW address shown in FIG. 36, from which the control program goes up to a routine 131 through: a SEW 00 address 126; a routine 127 which transfers memory contents of the ABS B REG, ABS X REG and ABS Y REG to the corresponding ABSO B REG, ABSO X REG and ABSO Y REG that are provided to store absolute coordinate data of the embroidering start position along the B, X and Y axes, respectively; a routine 128 which writes an initial address of the CMND DATA REG in the L ADR CMND REG which stores an address from which memory contents of the CMND DATA REG is extracted or read out sequentially; a SEW 10 address 129, and; a routine 130 which discriminates the memory contents of the CMND DATA REG which is designated by an address stored in the L ADR CMND REG. The routine 131 increases memory contents of the L ADR CMND REG which sequentially reads out the memory contents of the CMND DATA REG. From the routine 131, the control program returns to the SEW 10 address 129 and goes to a routine 133 through the routine 130 and a routine 132 which updates memory contents of the CTRL REG according to the command codes stored in the CMND DATA REG. The routine 133 increases the memory contents of the L ADR CMND REG. From the routine 133, the control program goes to a SEW 20 address 138 through: the routine 130; a routine 134 which extracts or reads out in the first step pattern data stored, including coordinate data SD1 (X1, Y1), SD2 (X2, Y2) . . . SDn (Xn, Yn) defining each of stitch zones (shown in FIGS. 12 through 15), in the data bank 66b in accordance with pattern data command codes stored in the CMND DATA REG, works out in the second step actual stitch positions SN1, SN2, SN3, SN4 . . . SNn according to various control data stored in the CMND DATA REG from the pattern data which have been extracted in the first step, calculates in the third step sew data or processed pattern data including position data to move the frame 19 to positions SS1, SS2, SS3, SS4 . . . SSn and oscillating amounts B1, B2, B3 . . . Bn of the needle 4 when the frame is located at those positions SS1, SS2, SS3, SS4 . . . SSn, and sequentially stores in the last step the calculated data in the SEW DATA REG shown in FIG. 12; a routine 135 which increases the memory contents of the L ADR CMND REG; a routine 136 which establishes a high level signal in the FROM SEW REG, and; a routine 137 which stores an initial address of the L ADR SEW REG which stores an address from which memory contents of the SEW DATA REG is sequentially extracted.

Thus, with the above routines being executed, the entered command codes which have been stored in the CMND DATA REG are sequentially extracted beginning with a start command code stored at the initial address up to codes to specify a distance and the "katakana" letter "ソ", and the data to move the frame 19 relative to the needle 4 to each stitch position of the "katakana" letter "イ" of the stitch pattern (the numbers of pulses to drive the second, third and first pulse motors 14, 15 and 8, and sign codes to designate directions of their rotation) are stored in the SEW DATA REG.

After the control program has jumped to the SEW 20 address 138 shown in FIG. 36, it proceeds to a routine 139 which extracts and discriminates the memory contents of the SEW DATA REG, and then goes to a routine 140 which increases the memory contents of the L ADR SEW REG to sequentially extract the next command code stored in the SEW DATA REG. Then, the control program returns to the routine 139, from which it goes to SEWF address 141 and further to a routine 145 via the following routines: a routine 142 which checks to see if a high level signal is present in the MMD REG; a routine 143 which drives the second and third pulse motors 14 and 15 to move the frame 19 along the X and Y axes according to non-stitch feed data stored in the SEW DATA REG, and; a routine 144 which increases the memory contents of the L ADR SEW REG. The routine 145 checks to see if a high level signal is present in the SGL STIT REG. Now, the control program returns to the SEW 20 address 138.

Figure 13:
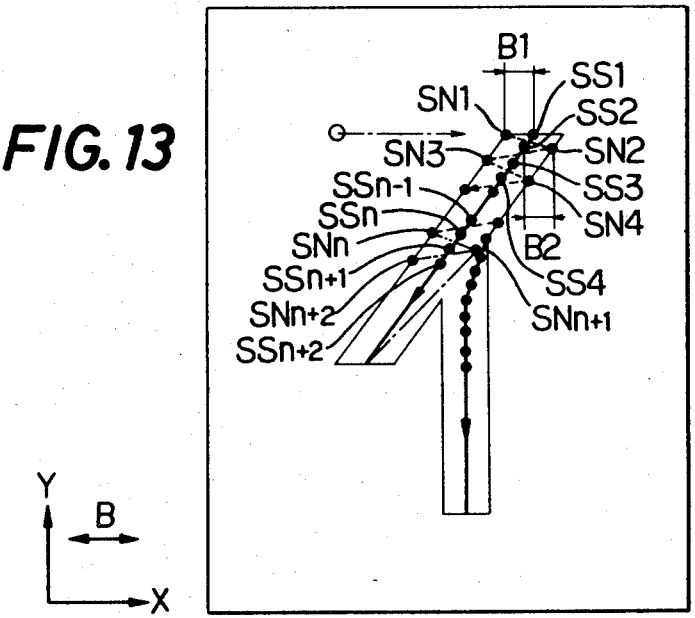
Figure 14:
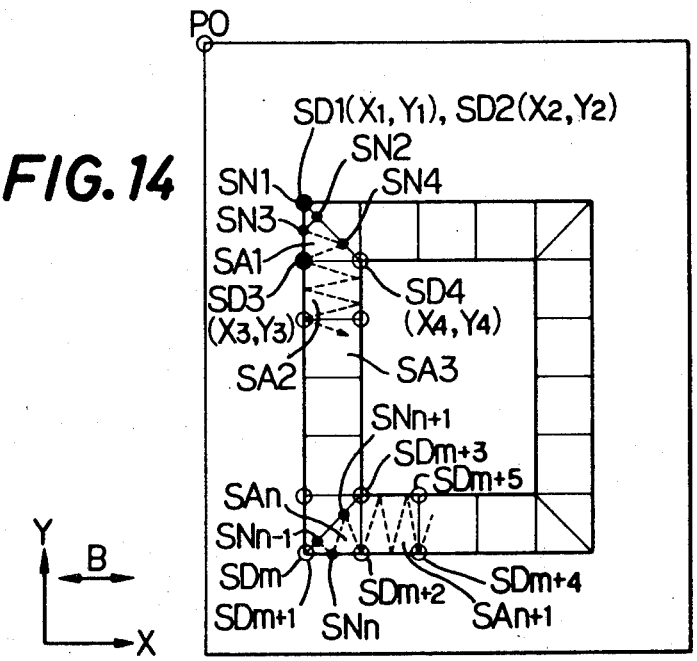

Accordingly, with the above routines executed, the start and non-stitch feed data stored in the SEW DATA REG are extracted, and the frame 19 is moved relative to the center of the needle 4 from the embroidering start position (pattern reference zero position P0) to a position SS1 shown in FIG. 13 by the second and third pulse motors 14 and 15 according to the non-stitch feed data.

Then, the control program leaves the SEW 20 address 138 and goes to a routine 151 through the following address and routines: the routine 139; a SEW S address 146; a routine 147 which checks to see if a high level signal is present in the MMD REG which stores data representing whether a main drive command signal MMD is applied to the drive circuit 74; a routine 148 which applies drive pulses to the drive circuits 72 and 73 to drive the second and third pulse motors 14 and 15 according to the processed pattern data stored in the SEW DATA REG; a routine 149 which increases the memory contents of the L ADR SEW REG, and; a routine 150 which checks the memory contents of the registers such as MCHN LOCK REG, SGL DATA REG and SGL STIT REG. The routine 151 applies the main motor drive command signal MMD to the drive circuit 74. From the routine 151, the control program returns again to the SEW 20 address 138.

With the above routines executed in the above order, the main drive command signal MMD is applied to the drive circuit 74 to start operation of the main drive motor according to the first processed stitch data stored in the SEW DATA REG. Since the frame 19 has been moved with the non-stitch feed data to the specified position SS1 at which the first stitch is formed, no drive pulses are applied to the second and third drive circuits 72 and 73 at this time, but a drive pulse signal is applied to the first drive circuit 71 to set the adjusting mechanism 7 so that an oscillating amount of the needle 4 is B1 as shown in FIG. 13.

In the next step, the control program again leaves the SEW 20 address 138 and proceeds up to a routine 158 via the following address and routines: the routine 139; the SEWS address 146; the routine 147; a routine 152 which presents a main motor driving speed signal MOSPD to the main drive circuit 74 after calculating the most suitable driving speed depending upon the numbers of pulses which are applied to the second and third drive circuits 72 and 73 according to the processed pattern data stored in the SEW DATA REG; a routine 153 which checks to see if the presented main motor driving speed signal MOSPD can be adopted to one of predetermined four kinds of speed signals MOSPD1, 2, 3 and 4; a routine 154 which generates a signal to select that circuit from among MOSPD1 through MOSPD4 which presents the most suitable speed signal; a routine 155 which checks to see if a synchronizing signal SYC based on a needle up signal NDLUP which is presented from the drive circuit 74 when the needle 4 leaves the workpiece 9 upwardly during its vertical reciprocation, is consistent with the memory contents of an internal synchronization mode register ISM REG; a routine 156 which applies drive pulses to the first, second and third drive circuits 71, 72 and 73 according to the next processed stitch data stored in the SEW DATA REG, and; a routine 157 which increases the memory contents of the L ADR SEW REG. The routine 158 checks the memory contents of the SGL STIT REG and MCHN LOCK REG. From the routine 158, the control program again returns to the SEW 20 address 158.

With the above routines executed in the above order, a main drive motor speed command signal is applied to the drive circuit 74 according to the first processed stitch data stored in the SEW DATA REG, and the first stitch is formed at the first stitch position SN1 on the workpiece 9 according to the first processed stitch data. Further, the drive pulses are applied to the first, second and third circuits 71, 72 and 73 according to the second processed stitch data in order for the frame 19 to move from a position SS1 corresponding to the first stitch position SN1 up to a position SS2 corresponding to the second stitch position SN2 after the needle 4 has left the workpiece 9 to a position above the first stitch position SN1 upon completion of the first stitch, and thus an oscillating amount of the needle 4 is set and the frame 19 is moved along the X and Y axes so that the second stitch may be formed at the second stitch position SN2 on the workpiece by means of the operation of the first, second and third pulse motors 8, 14 and 15.

Following the above step, the control program takes the path via the previously stated SEWS address 146 or SEW F address 141 according to the memory contents of the SEW DATA REG (stitch or non-stitch feed data) which are sequentially extracted by the routine 139. The execution of the above path is repeated the number of times designated in the SEW DATA REG. As a result, the frame 19 is moved step by step to positions SS3, SS4 . . . SSn corresponding to the actual stitch positions SN3, SN4 . . . SNn according to the commands and data stored in the SEW DATA REG in order to form a required number of stitches on the workpiece, and the oscillating amount of the needle 4 is set so that the stitches are formed at the positions corresponding to the stitch position SN3, SN4 . . . SNn. Thus, there may be formed the required number of stitches for forming the "katakana" letter pattern "イ" of the combined embroidery or combination pattern constituted by the letters "イ", "ロ" and "ハ".

Then, the control program leaves the SEW 20 address 138 and proceeds to a routine 161b via the following routines: the routine 139; a routine 159 which establishes a low level signal in the ON STIT REG and FROM SEW REG; a routine 160 which applies a needle stop signal to the drive circuit 74 to stop the needle 4 at a position above the workpiece, and; a routine 161a which checks to see if a high level signal is present in the SGL STIT REG or SGL DATA REG. The routine 161b applies drive pulses to the second and third drive circuits 72 and 73 according to the distance data of the control data in order to move the frame 19 to the reference zero position P0 of the second letter pattern "ロ". From the routine 161b the control program jumps to the SEW 10 address 129.

Accordingly, the needle 4 is stopped by the routine 160 at the position above the workpiece after the stitches of the "katakana" letter "イ" have been embroidered, and then the distance data is read out by the routine 161b whereby the frame 19 is moved by a distance according to that distance data to embroider the next letter "ロ".

Figure 15:
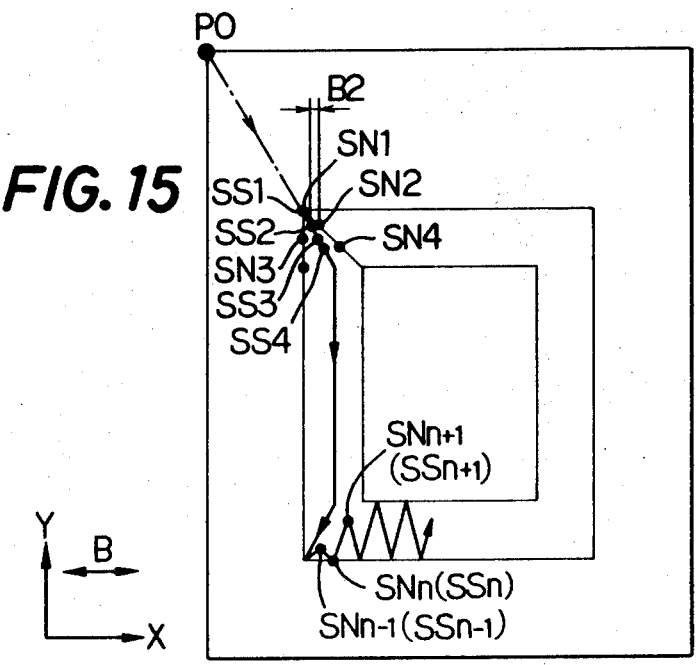

Subsequently, the stitches of the "katakana" letter "ロ" are formed on the workpiece 9 in the same manner as used for embroidering the stitches of the letter "イ", with the exception that the stitch data for stitch zones SAn, SAn+1 ... etc. of the letter "ロ" stored in the SEW DATA REG, represent worked out stitch positions SNn−1, SNn, SNn+1 ... etc. to which the frame 19 is moved, and that the first pulse motor 8 to set an oscillating amount of the needle 4 in forming the pattern according to such processed stitch data is fixed at its zero position whereby the frame 19 is moved by the second and third pulse motors 14 and 15 without oscillation of the needle 4 and therefore zigzag stitches are formed on the workpiece 9 as shown in FIG. 15.

After all the letter patterns "イ", "ロ" and "ハ" have been formed on the workpiece, the control program again returns to the SEW 10 address 129, goes through the routine 130 to a routine 162 which moves the frame 19 to the embroidering start position of the first letter pattern, and then proceeds to a routine 163 which establishes a high level signal in the CYCLE END REG. From the routine 163, the control program returns to the main address and the monitor loop 106 is repeatedly executed.

Accordingly, the frame 19 is returned to the embroidering start position i.e. the reference zero position P0 of the first letter pattern after the stitches for all three letters programmed by the operator have been embroidered. It is therefore possible to start another embroidering cycle if the workpiece 9 is replaced with a new one.

If the X and Y movements of the frame 19 are too large to be completed while the needle 4 is above the workpiece 9 during formation of each letter of the said embroidery, a routine 164 is executed to apply a signal to the drive circuit 74 to temporarily stop the needle 4 at a position above the workpiece. The stopped needle 4 is started again through execution of a routine 165 which presents signal to the drive circuit 74 to resume operation of the main drive motor. Thus, the operation of the main drive motor 47a may be interrupted and re-started.

Figure 20:
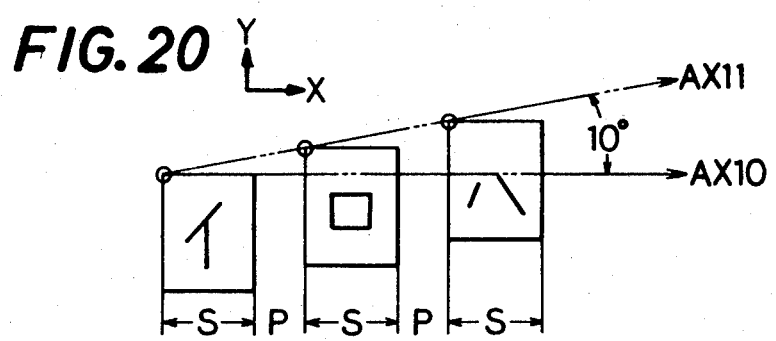
Figure 21:
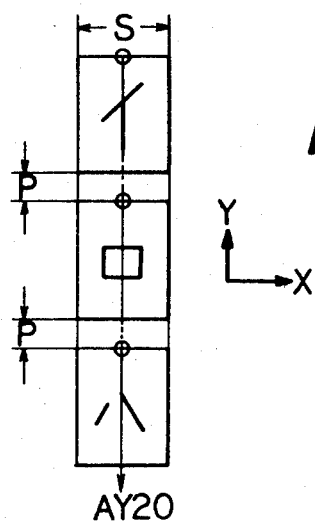
Figure 22A:
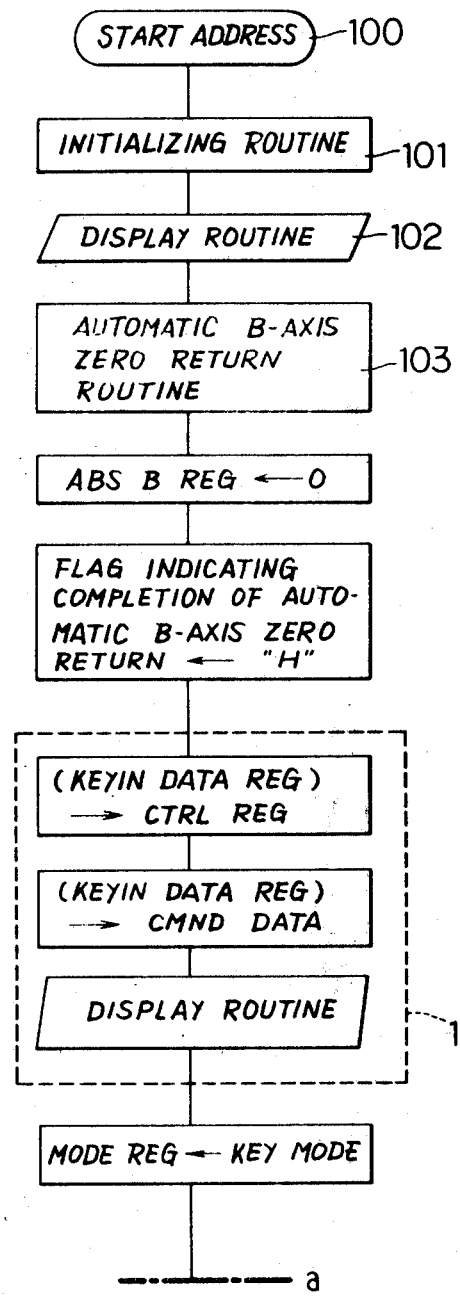
FIGS. 22A, 22B and 22C, when assembled as shown in FIG. 39, is a flow chart showing a main routine of a control program of the machine.
Figure 23:
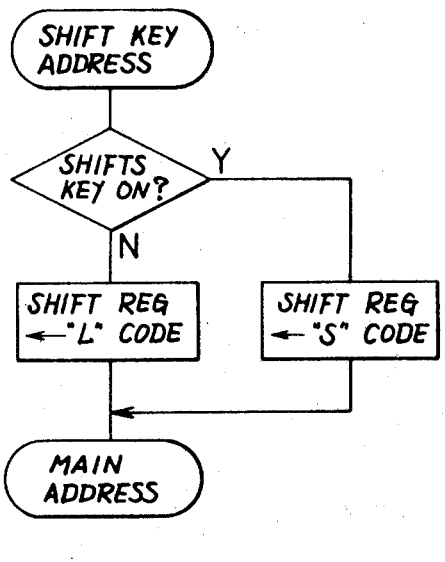
FIG. 23 is a flow chart showing a SHIFT KEY routine of the control program.
Figure 22B:
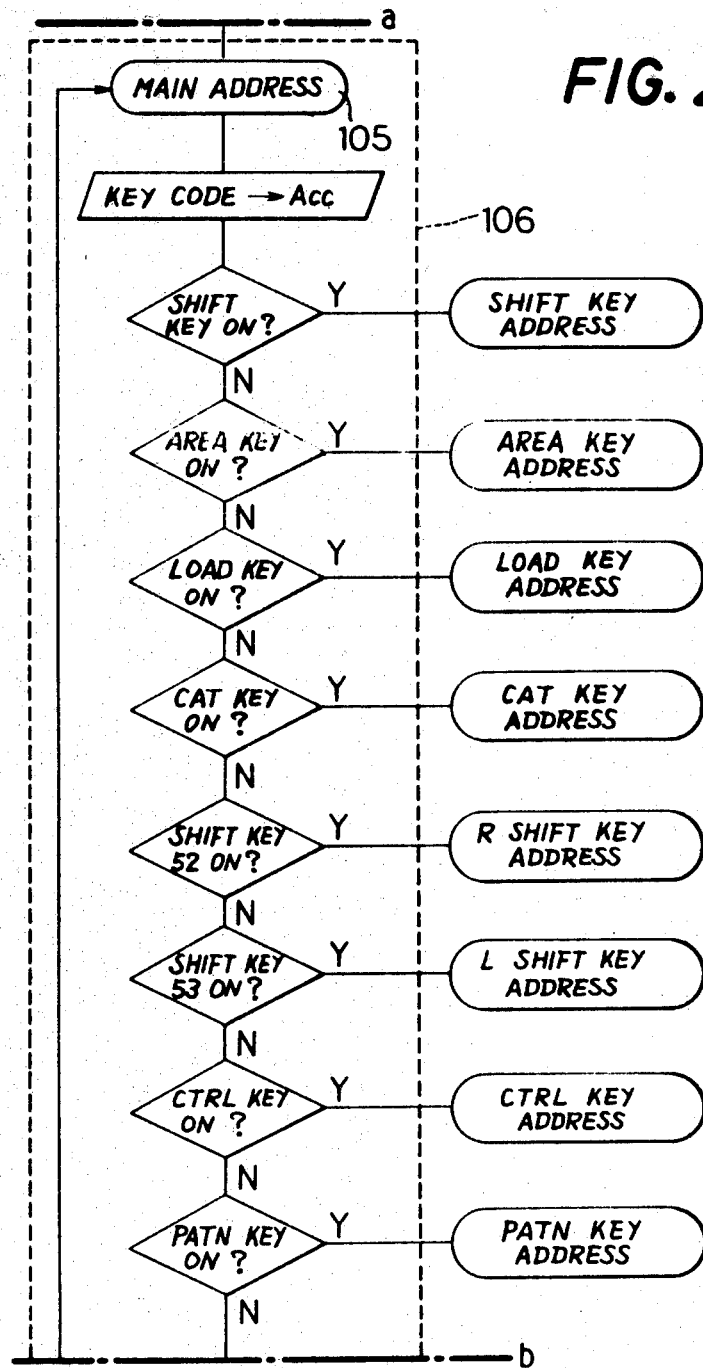
Figure 22C:
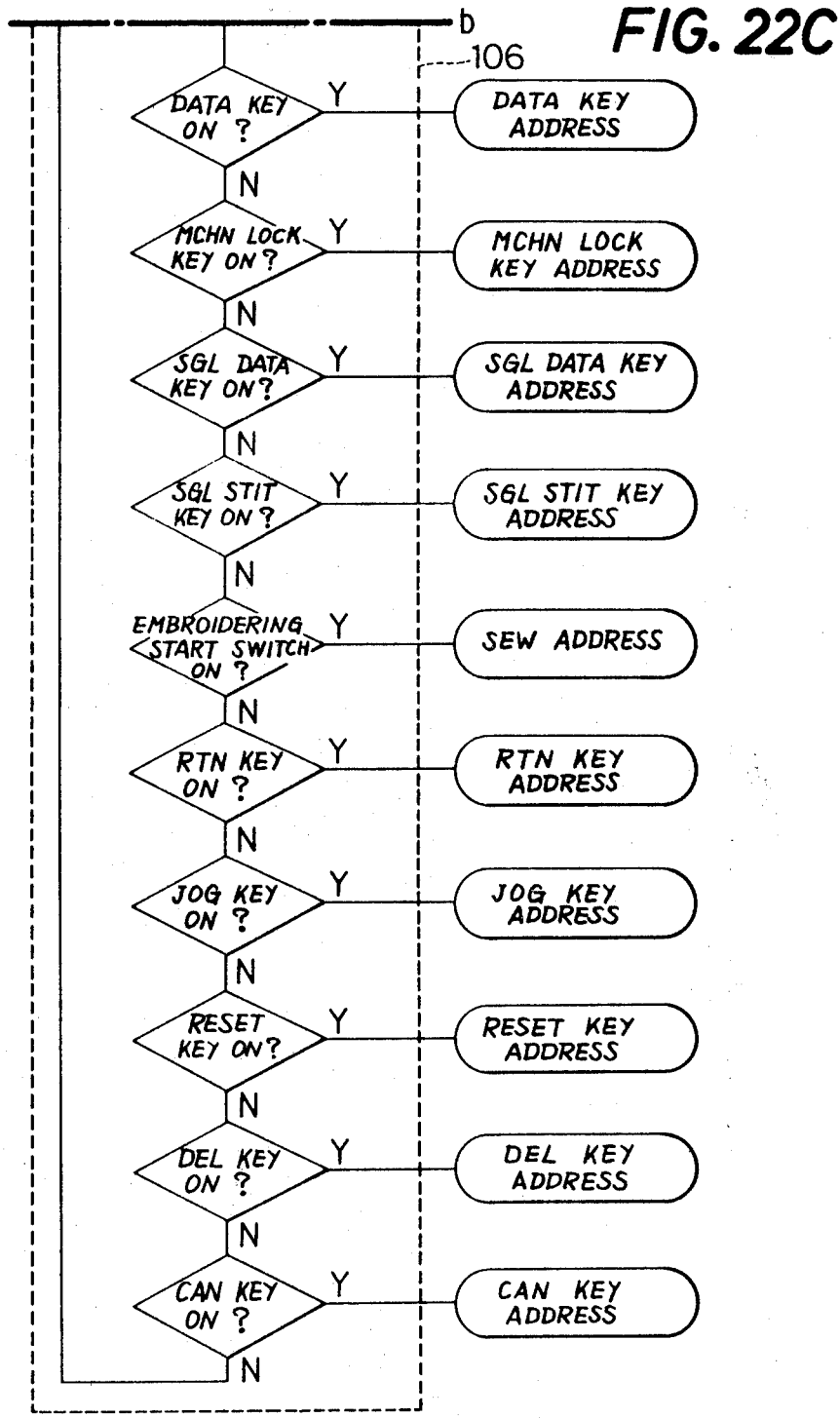

While the standard control data for forming the previous embroidery of letters "イ", "ロ" and "ハ", include the "Arrange" data (AX30) which designates the arrangement of the letters as shown in FIG. 19, it is possible to change this arrangement to such as shown in FIG. 20 or 21 by changing the "Arrange" data (AX30) to (AX11) or (AY20) through operation of the keyboard in the similar manner as used for making the previous change of the "Distance" data from (Distance 10) to (Distance 05). In other words, changing the "Arrange" data will permit the operator to select any desired reference point (P1, P2 ... shown in FIG. 18), and straight line (AX3, AX2 ... AY-1, AY0 ... shown in FIG. 17) along which the "katakana" letters "イ", "ロ" and "ハ" are disposed on the workpiece 9 with the selected reference points placed on the line. It is also possible to select desired X-axis dimension of each letter over a range from 1 mm to 99 mm by changing the "Size" data through the keyboard. The "Size" data of the selected dimension is sequentially stored into the SEW DATA REG through execution of the routine 134 shown in the flow chart in FIG. 36, and the letters are embroidered to the selected size through execution of the routines following the routine 134.

While the standard "Size" data for the above formation of the embroidery "イロハ" selects the same size for all three letters, it is possible to enlarge or contract the size of a particular letter, for example, the letter "ロ" only. In this case, the "Size" data designating a desired larger or smaller size of the letter "イ" may be entered after the entry of the control data on the letter "イ" is completed and before the entry of the selection command signal of the letter "ロ". Then, the entry of the control data of the letter "ハ" is executed similarly to that of the letter " ".

It is needless to say that the control data other than the "Size" data may also be different for a particular letter or letters of an embroidery or a combination pattern. Such different control data may be entered during a series of data entry through the keyboard for the individual letters in the same way as previously stated.

Although there has been described the specific example of making the embroidery or the combination pattern "イロハ" consisting of the Japanese "katakana" letters "イ", "ロ" and "ハ", Chinese letters or special letters or symbols other than those provided on the data input keys 36 on the keyboard 27 (English letters, numerals, "katakana" letters and symbols) may be embroidered as desired on the workpiece 9, because there are stored in the data bank 66b of the ROM 66 various blocks of unit pattern information corresponding to such special letters and symbols, one or more of which may be selected from the storage bank 66b by operating the PATN key 48 and formed on the workpiece by entering the control data for them through the appropriate keys in the same manner as used in making the control data entry for the embroidery "イロハ" according to the flow chart given in FIG. 30 which shows the PATN key routine. Also stored in the data bank 66b are pattern data corresponding to Japanese "hiragana" letters and English scripts which are selectable by the operator through the selector keys 37, 38 and 39 in combination with the SHIFT L and S keys 41 and 42.

In the above embroidering operation to form the "katakana" embroidery "イロハ", the embroidering operation cycle leading to formation of the embroidery "イロハ" on the workpiece 9 may be started by activating the embroidering start switch 23 which activates the main drive circuit 74 if pressed while the light emitting diodes 33a, 34a and 35a on the MCHN LOCK, SGL DATA and SGL STIT keys 33, 34 and 35 are all in the OFF state. If the MCHN LOCK key 33 is pressed and the diode 33a turned ON through execution of a routine 166 shown in FIG. 32, however, the control program jumps from the SEW key routine 150 shown in FIG. 36 to the SEW 20 address 138 without going to the routine 151 and therefore a main drive signal is not applied to the drive circuit 74. Subsequently, the control takes a looped path to return again to the SEW 20 address 138 via the routines 139, 147, 148, 149 and 150, and then proceeds to the routine 148 which permits only the second and third pulse motors 14 and 15 to operate thereby allowing the frame 19 to move. If the SGL DATA key 34 is pressed and the diode 34a turned ON through execution of a routine 167 shown in FIG. 33, the control program jumps from the routine 161a shown in FIG. 36 to the main address and therefore the embroidering cycle is temporarily interrupted at the end of the formation of the first "katakana" letter "イ". If the SGL STIT key 35 is pressed and the diode 35a turned ON through execution of a routine 169 shown in FIG. 34, the control program returns from the routine 145 to the main address and therefore the embroidering cycle is stopped after only the first feed command for the first letter "イ" has been executed, and if the start switch 23 is pressed in this condition the control program takes a looped path to return to the main address again through the routine 150 and routines 170 and 171 whereby the re-started cycle is again stopped after the first processed stitch data has been executed.

In this embodiment, it is also possible to store in the FILE REG of the RAM 65 various program data including, for example, "R10, D05, イロノ\" specifying the allowable movement area of the frame, distance between the letters and selection of the letters "イ", "ロ", and "ノ\", respectively. In more detail, the control program jumps to a CAT key routine shown in FIG. 26 when the CAT key 50 is pressed, and the programmed data are stored at specified addresses of the FILE REG in the RAM 65 through execution of routines 172, etc. If the LOAD key 51 is pressed thereafter, the control program jumps to a LOAD key routine shown in FIG. 25 and the data stored in the FILE REG is read out through execution of routines 173, etc. Accordingly, if the operator stores in the FILE REG the programmed data for the letter patterns "イ", "ロ" and "ノ\" by pressing the CAT key after the embroidering cycles are finished, the stored data for the same embroidery may be retrieved simply by pressing the LOAD key 51 even after an embroidery consisting of other letters or symbols has been formed on the same or another workpiece 9. This feature eliminates the need of re-entering the programmed data for the first embroidery "イロノ\" after the programmed data for the second embroidery has been executed.

If any new embroidery pattern or combination stitch pattern which is partly different from the combination stitch pattern based on the programmed data recorded in specified addresses of the FILE REG, i.e., R10, D05, and "イロノ\", is required to be formed on the workpiece, for example, a combination stitch pattern in which only one letter "イ" out of a series of letters "イロノ\" is desired to be larger than the remaining letters, the operator can alter the programmed data easily so as to be adapted to the necessary combination stitch pattern. That is to say, pressing of the LOAD key 51 returns the control program from the LOAD key address shown in FIG. 28 to the main address through the routine 173. The programmed data for the combination stitch pattern recorded in the FILE REG is extracted to the KEYIN DATA REG and in the dot-matrix indicator 56 a display "AX, S, D, W, M, N, R10, D, イ , ロ, ノ\" will be made as illustrated in FIG. 2. Next, when the operator presses the R shift key 53 three times repeatedly, the control program is returned after executing the R shift routine shown in FIG. 27 three times to the main address 105, making a display of "AX, S, D, W, M, N, R10, D" in the dot-matrix indicator 56. Operator's sequential pressings of the CTRL key 47, the English letter "S" key, "1" key, "6" key in the group of the data input keys 36, and the ENTER key 46, for the purpose of enlarging the size of the "katakana" letter "イ" to a desired extent, for example, 16 mm in the X axis direction and 20 mm in the Y axis direction, makes the control program progress as mentioned earlier from the monitor loop 106, passing through the routines 116, 117a, 118, 119a, 119b, 120, 121, etc., to finally return to the monitor loop 106 again. Therefore, display of "AX, S, D, W, M, N, R10, D, S" will be made in the dot-matrix indicator 56 and the display in the numeral indicator 60 will be changed from "08" to "16". When the L shift key 52 is pressed once next, a display in the dot-matrix indicator 56 "AX, S, D, W, M, N, R10, D, S, イ" will be made by the execution of the L shift routine shown in FIG. 28. If the operator sequentially presses the CTRL key 47, the English letter "S" key, "0" key, "8" key in the group of data input keys 36, and the ENTER key 46 for the purpose of maintaining the size of the "katakana" letters "ロ" and "ノ\" at 8 mm in the X axis direction and 10 mm in the Y axis direction (Size 08), the control program goes up from the monitor loop 106, passing through the entirely same routines to the abovementioned again to the monitor loop 106. As a result of this, a display of "AX, S, D, W, M, N, R10, D, S, イ , S" will appear in the dot-matrix indicator 56 and the display of "16" in the numeral indicator 60 will be changed to "08". Another double pressing of the L shift key 52 by the operator brings a display of "AX, S, D, W, M, N, R10, S, イ , S, ロ , ノ\" in the dot-matrix indicator 56 through execution of the L shift routine shown in FIG. 28.

The maximum movement amount of the embroidery frame 19 in the X and Y axes direction during the formation of the combination stitch pattern is calculated through execution of the routine 125 in a similar way as in the earlier statement. In a case when the calculated value exceeds the sphere, in which the frame is allowed to move, determined by the area setting (R10), the dot-matrix indicator 56 flickers to warn, as a matter of course, the operator of a misoperating of the machine. The partial size alteration of the combination stitch pattern is finished in this way.

Pressing of the embroidering start switch 23 in this stage by the operator enables the sewing machine to form a newly combined pattern on the workpiece through a similar path as earlier mentioned, wherein only the letter "イ" is in a large size (S16) and "ロ" and "ノ\" are in the standard size (S 08).

It goes without saying that this embodiment is capable of, in addition to the above-mentioned size alteration or variation, forming a newly combined pattern, wherein a desired unit pattern, a distance between the desired unit patterns, etc., are partially altered in respect of the "Distance", "Width", and "Number", is possible.

The following description explains the case where transfer of drive signals to the main drive circuit 74, and to the drive circuits 71, 72 and 73 for the first, second and third pulse motors are interrupted due to a thread breakage detection signal (BROKEN signal) from a thread breakage detector (not shown) or an emergency stop signal (EMERGENCY signal) from the emergency stop switch 24, those signals being generated by automatic activation of the detector or by operator's manipulation of the switch during the embroidering cycle to form the previous embroidery "イロハ".

Figure 37A:
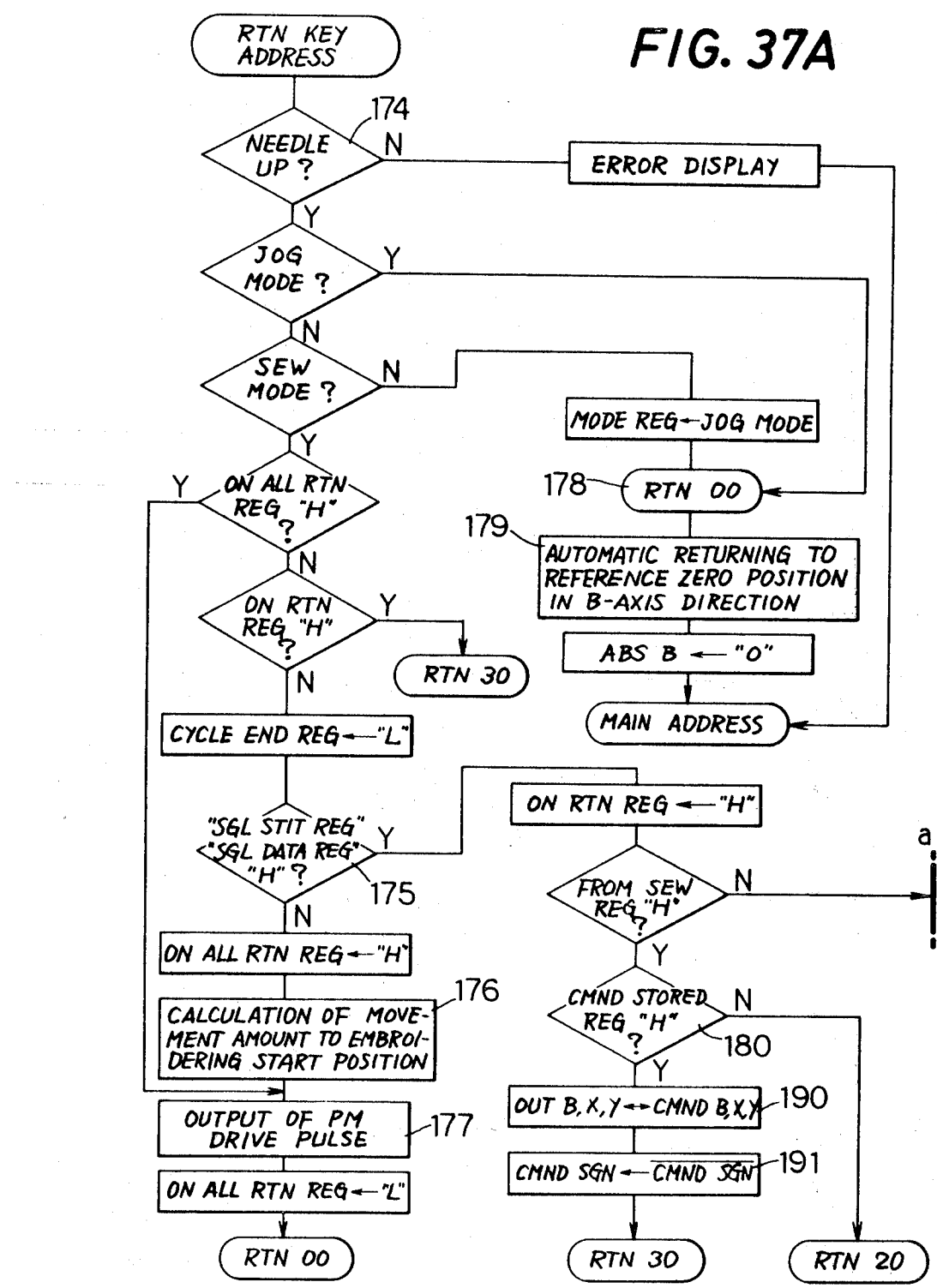
FIGS. 37A, 37B and 37C, when assembled as shown in FIG. 42, is a RTN (return) KEY routine of the control program.
Figure 37B:
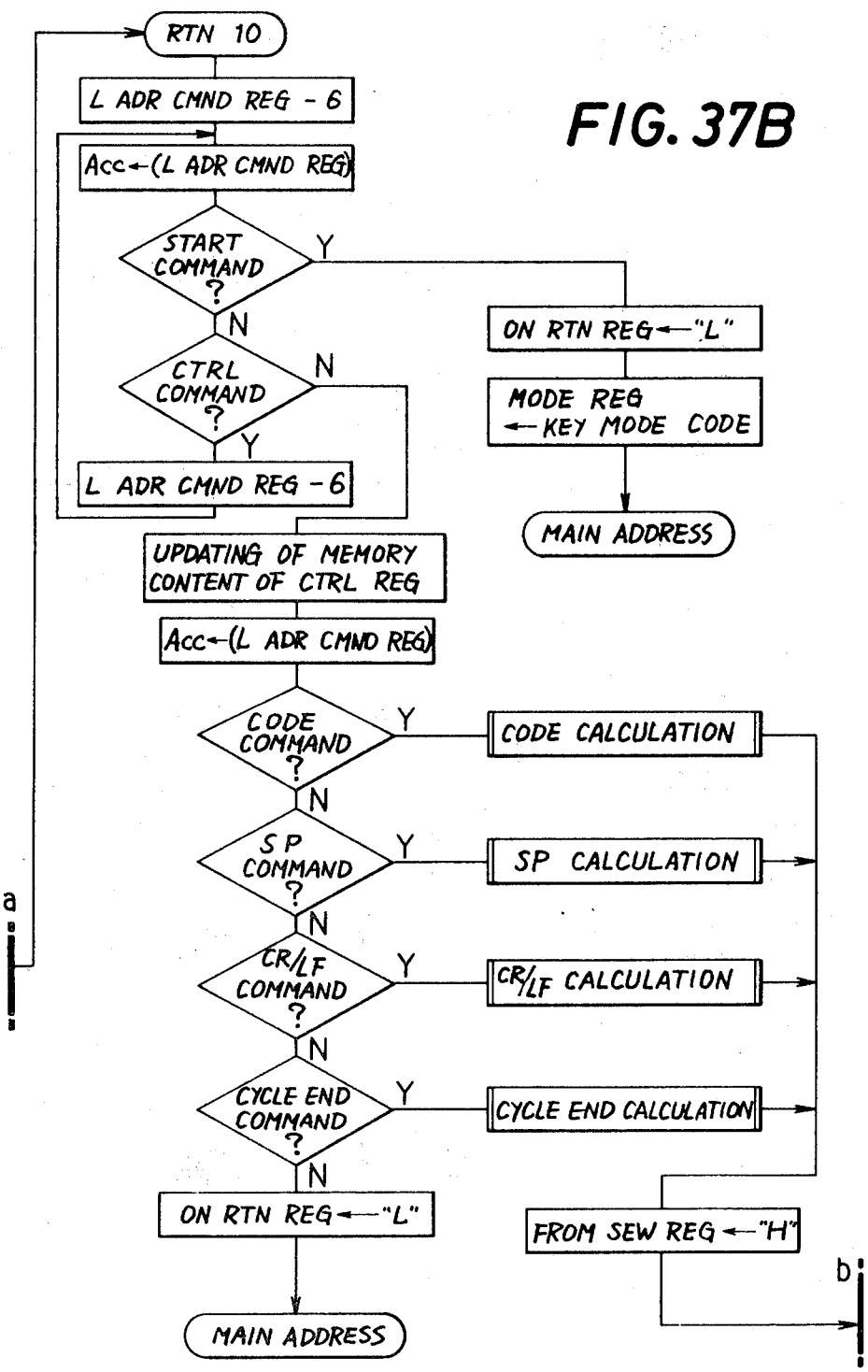
Figure 37C:
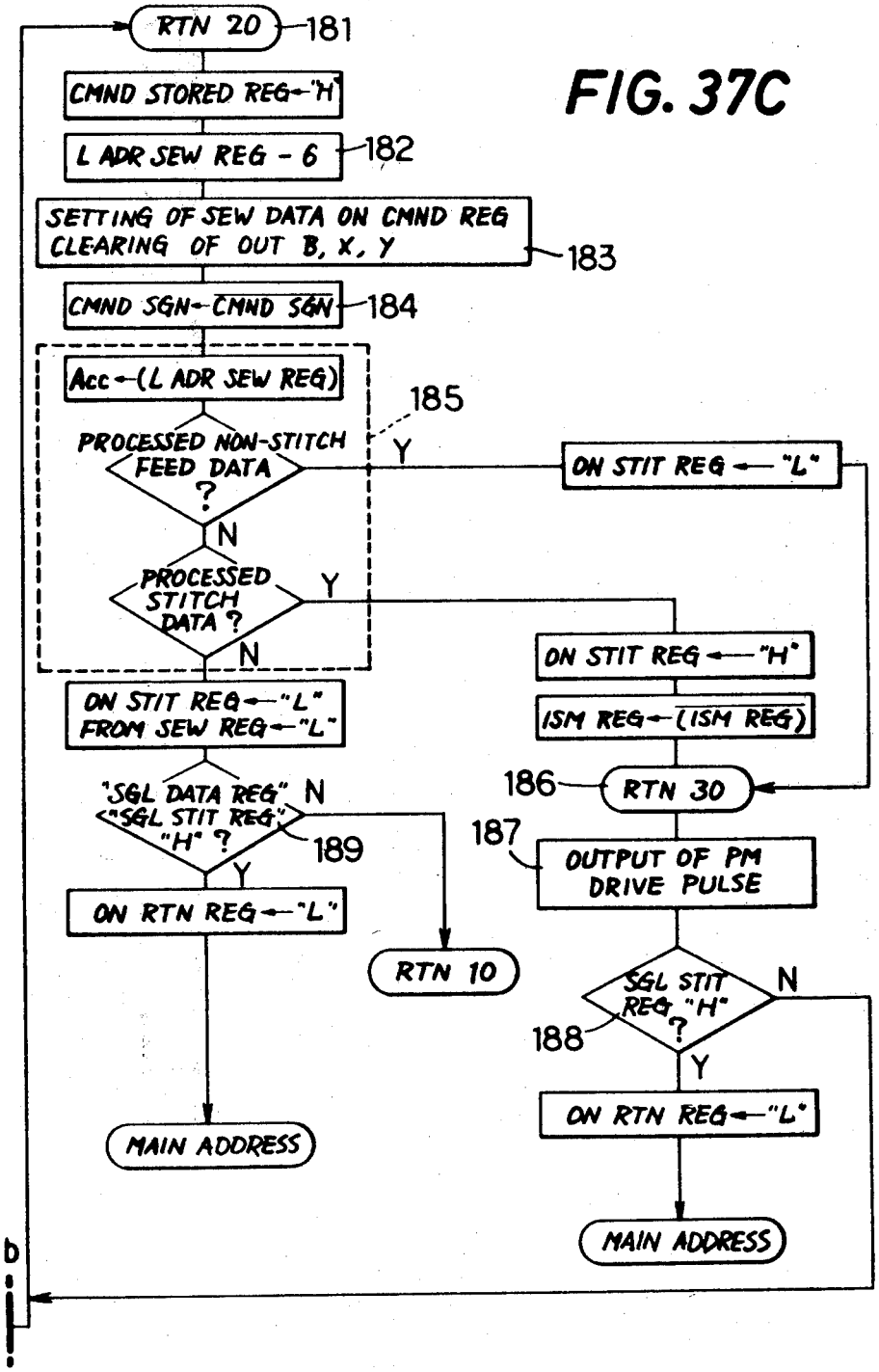

In the event the drive signals were stopped due to generation of the BROKEN signal at an early point in time of the embroidering cycle and the operator pressed the PTN key 32, the control program would jump from the monitor loop 106 to a RTN key routine shown in FIG. 37, and proceed up to the main address through the following address and routines: a routine 174 which checks to see if the needle 4 is at a position above the workpiece 9; a routine 175 which checks whether either the light emitting diode 34a on the SGL DATA key 34 or the diode 35a on the SGL STIT key 35 is illuminated; a routine 176 which calculates X and Y movement distances of the frame 19 from its current position to the embroidering start position based on X and Y coordinate values of the current position stored in the ABS X REG and ABS Y REG, and on X and Y coordinate values of the start position stored in the ABSO X REG and ABSO Y REG; a routine 177 which applies required numbers of drive signals to the second and third drive circuits 72 and 73 according to the calculated movement distances and thereby drives the second and third pulse motors 14 and 15; a RTN 00 address 178, and; a routine 179 which applies drive signals to the first drive circuit 71 to drive the first pulse motor 8 to its zero position. From the main address, the control program returns to the monitor loop 106 which is then executed repeatedly.

Accordingly, the frame 19 is moved to the embroidering start position P0 of the letter "イ" by the pulse motors 14 and 15, and the adjusting mechanism 7 is brought into its zero position so that the oscillating amount of the needle 4 is zeroed. The embroidering cycle may then be re-started by the operator from the beginning by pressing the start switch 23 following needle threading and removal of stitches already formed on the workpiece 9 or replacement of the workpiece with a new one. In this connection, the frame 19 would not be moved to the start position with the routine 174 if the needle 4 was not above the workpiece, i.e., below the workpiece upon generation of the BROKEN signal. But, it is also possible in this event that the frame 19 is moved to the start position after the needle 4 is automatically raised to the position above the workpiece.

In the event the transfer of drive signals to the drive circuits was stopped due to generation of the BROKEN signal a short time after initiation of forming the letter "ロ" and the RTN key 32 was pressed after the SGL DATA key 34 had been pressed to turn ON its light emitting diode 34a, the control program would jump from the monitor loop 106 to the RTN key routine and proceed up to a routine 188 through the following addresses and routines: the routines 174 and 175; a routine 180 which checks to see if a high level signal is present in the CMND STORED REG; a RTN 20 address 181; a routine 182 which reduces the memory contents of the L ADR SEW REG storing addresses of the SEW DATA REG from which the sew data or processed pattern data is extracted; a routine 183 which extracts the processed pattern data from the addresses designated by the memory contents of the L ADR SEW REG and stores in the CMND SGN B REG, CMND SGN X REG and CMND SGN Y REG drive signals to be applied to the first, second and third drive circuits 71, 72 and 73 according to the extracted processed pattern data; a routine 184 which reverses the sign of the memory contents of each CMND SGN register; a routine 185 which checks the data extracted from the SEW DATA REG; an RTN address 186, and; a routine 187 which feeds drive signals to the first, second and third drive circuits 71, 72 and 73 according to the memory contents of the respective CMND SGN registers. The routine 188 checks if the diode 35a on the SGL STIT key 35 is illuminated. From the routine 188, the control would jump to the RTN 20 address 181 and repeatedly take the same path as described above, viz., the loop via the routines 182 through 188. If the routine 185 found that neither feed nor stitch commands are extracted but a start command code is extracted from the SEW DATA REG, the control program would return to the main address through a routine 189 which checks to see if the diode 34a or 35a is illuminated. Then, the monitor loop 106 would be executed repeatedly.

Accordingly, the frame 19 is first stopped temporarily when the RTN key 32 is pressed by the operator and then moved back to the reference zero position of the letter "ロ" taking a path along which the frame has been moved. In this condition, the operator threads the needle and removes the stitches already formed in the second letter area of the workpiece 9, and presses the embroidering start switch 23 to re-start the embroidering operation from the beginning of the letter "ロ". If the drive signals failed to be generated before the frame 19 reached any of the positions SS1, SS2 . . . etc. corresponding to the stitch positions SN1, SN2 . . . etc. shown in FIGS. 13 through 15, the control program would jump from the routine 180 to the RTN 20 address 181 after going through a routine 190 which transfers the memory contents of the OUT B REG, OUT X REG AND OUT Y REG to CMND SGM B REG, CMND SGN X REG nad CMND SGN Y REG, and a routine 191 which reverses the sign of the memory contents of each CMND SGN register. Thus, the frame 19 is returned to the start position of the letter "ロ" in the same manner as previously indicated.

If the drive signals failed to be generated due to generation of the BROKEN signal when most of the stitches to constitute the letter "イ" have been formed, for example, when the frame 19 is located at a position SSn+2 (shown in FIG. 12) corresponding to a stitch position SDn+2 and the letter "イ" has been formed up to the stitch SNn, and the RTN key 32 was pressed after the SGL STIT key 35 had been pressed to turn ON the diode 35a, the control program would jump from the monitor loop 106 to the routine 188 of the RTN key routine through: routines 174, 175 and 180; RTN 20 address 181; routines 182, 183 and 185; RTN 30 address 186, and; routine 187. From the routine 188, the control program would return to the main address and the monitor loop 106 is again executed repeatedly.

Accordingly, the frame 19 stopped at the position SSn+2 corresponding to the stitch position SNn+2 is moved to the stitch position SSn+1 corresponding to the stitch position SNn+1 which is adjacent to the stitch position SNn+2 when the RTN key 32 is pressed.

If the frame 19 had not been moved to the position SSn+2 corresponding to the stitch position SNn+2, the control program would jump from the routine 180 to the RTN 30 address 186 through the routines 190 and 191. In this case therefore, the frame 19 is returned to the position SSn+1 corresponding to the stitch position SNn+1 in the same manner as indicated above. If the RTN key 32 is again pressed, the control program will take the same path as previously described, i.e., via the routines 174, 175 and 180, RTN 20 address 181, routines 182, 183 and 185, RTN 30 address 186 and routines 187 and 188, to return to the main address, and the monitor loop 106 is again executed repeatedly.

Thus, by operating the RTN key 32, the frame 19 may be moved finally to the position SSn corresponding to the stitch position SNn to which the stitches have been actually formed. Now, the embroidering cycle may be re-started from the position SNn of the letter "$\prime$" by pressing the start switch 23 after the diode 35$a$ is turned OFF with the SGL STIT key 35 pressed.

If and when the operator has made an error in returning the embroidery frame 19 to the position SSn of over-returning beyond that position as far as, for example, SSn−1, the over-returning of the embroidery frame 19 can easily corrected by pressing the embroidery switch 23 after pressing the above-mentioned MCHN LOCK key 23.

For describing this embodiment an industrial sewing machine is being assumed, wherein the needle is laterally oscillated in addition to the vertical reciprocation, as a machine on which this invention is applied, but this invention is of course allowable to be incorporated in an ordinary sewing machine wherein the relative movement between the needle and the workpiece is made unilaterally by the movement of the workholder alone as no lateral movement of the needle is expected there.

Besides, concerning the operation of returning the workpiece 9 and the embroidery frame 19 which have been halted at the position SSn+2 by a thread breakage signal or the like back to the thread breakage position SSn, the operator should press the RTN key 32 in the above-mentioned embodiment for intermittently moving them as far as the thread breakage position SSn while ascertaining the arrival thereof to the target position by visual watching, but it may be replaced by an automatic returning of the workpiece 9 and the embroidery frame 19 in an intermittent movement. For that purpose a counter is disposed for counting the number of vertical movement of the needle 4 after the occurrence of the thread breakage. Upon a suitable after-treatment for the thread breakage a returning signal produced by an operation of the operator automatically moves them just by the stored number in the counter for returning to the target position and further restarting the embroidery pattern formation.

A unit stitch pattern is in the above-mentioned embodiment divided into a plurality of stitch zones and the number of stitches to be formed for each stitch zone is being designated in common to all of the stitch zones. It is however possible to individually form a particular unit stitch pattern, different in the density of stitch in each stitch zone, by means of designating a different number of stitch to each of the stitch zones. Incidentally, in case of such a simple unit stitch pattern as to allow the whole thereof to be handled as one comprehensive stitch zone there is no need of dividing the pattern into a plurality of zones.

What is claimed is:

1. An automatic sewing machine comprising:
    stitch forming means including a reciprocatory needle;
    a workholder for holding a workpiece during sewing operation, said workholder being movable in a coordinate plane defined by X and Y axes which are perpendicular to one another;
    drive means to move said workholder along said X and Y axes for varying the relative position between said workholder and said needle to form a unit stitch pattern consisting of plural cell patterns which are each defined by a respective one of plural geometrical parts respectively of a sphere in which said unit stitch pattern is to be formed, said sphere being predeterminately divided into said geometrical parts with plural straight lines;
    memory means for storing unit stitch pattern information consisting of plural blocks of cell pattern information corresponding to said plural geometrical parts and each including plural sets of X and Y coordinate data representing location of apexes of said geometrical parts respectively;
    manually operable input means for setting up desired number of stitches to be formed in each of said plural cell patterns, said manually operable input means generating stitch number data corresponding to said number of stitches; and
    control means for calculating position data related to actual stitch positions in said unit stitch pattern according to said coordinate data and said stitch number data, and for supplying the calculated position data to said drive means in timed relating with reciprocation of said needle.

2. An automatic sewing machine as set forth in claim 1, wherein said drive means includes a pair of pulsemotors to move said workholder respectively along said X and Y axes.

3. An automatic sewing machine as set forth in claim 1, wherein said control means includes a microprocessor connected to said manually operable input means, memory means for storing program to calculate said coordinate position data, and temporary memory means for storing the calculated coordinate position data.

4. An automatic sewing machine comprising:
    stitch forming means including a reciprocatory needle;
    a workholder for holding a workpiece during sewing operation, said workholder being movable in a coordinate plane defined by X and Y axes which are perpendicular to one another;
    drive means to move said workholder along said X and Y axes for varying the relative position between said workholder and said needle to form a unit stitch pattern consisting of plural cell patterns a majority of which are each defined by a respective one of plural quadrangular parts of a sphere in which said unit stitch pattern is to be formed, said sphere being predeterminately divided into said quadrangular parts;
    memory means for storing unit stitch pattern information including plural blocks of cell pattern information corresponding to said plural quadrangular parts and each including X and Y coordinate data representing location of apexes of each of said quadrangular parts;
    manually operable input means for setting up desired number of stitches to be formed in each of said cell patterns, said manually operable input means generating stitch number data corresponding to said number of stitches; and control means for calculating coordinate position data related to actual stitch positions in said unit stitch pattern according to said coordinate data and said stitch number data, and for supplying the calculated coordinate position data to said drive means in timed relation with reciprocation of said needle.

5. An automatic sewing machine comprising:

stitch forming means including a reciprocatory needle;

a workholder holding a workpiece during sewing operation and movable along X and Y axes perpendicular to one another;

drive means for moving said workholder along said X and Y axes and thereby varying the relative position between said workholder and said needle to form a letter pattern whose area to be sewn is divided into plural geometrical parts a majority of which are quadrangles;

memory means for storing letter pattern information including plural blocks of geometrical information corresponding to said quadrangles and each including X and Y coordinate data representing location of corner points of said quadrangles;

manually operable input means for setting up desired number of stitches to be formed in each of said geometrical parts, said manually operable input means generating stitch number data corresponding to said number of stitches; and control means for calculating coordinate position data related to actual stitch positions in said letter pattern according to said coordinate data and said stitch number data, and for supplying the calculated coordinate position data to said drive means in timed relation with reciprocation of said needle.

6. An automatic sewing machine as set forth in claim 5, wherein at least one of said plural geometrical parts is a triangle.

7. An automatic sewing machine as set forth in claim 4, further comprising another drive means for causing jogging movements of said needle and wherein said memory means further stores data related to an amount of said jogging movements of the needle.

8. An automatic sewing machine as set forth in claim 7, wherein said another drive means includes a pulsemotor, and said second drive means for varying said relative position includes a pair of pulsemotors to move said workholder respectively along said X and Y axes.

* * * * *